United States Patent
Park et al.

(10) Patent No.: US 11,404,042 B2
(45) Date of Patent: Aug. 2, 2022

(54) ELECTRONIC DEVICE AND OPERATION METHOD THEREOF

(71) Applicant: SAMSUNG ELECTRONICS CO., LTD., Suwon-si (KR)

(72) Inventors: Gihoon Park, Suwon-si (KR); Jinhyun Kim, Suwon-si (KR); Sangshin Park, Suwon-si (KR); Eunae Cho, Suwon-si (KR); Saeeun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 330 days.

(21) Appl. No.: 16/682,324

(22) Filed: Nov. 13, 2019

(65) Prior Publication Data

US 2020/0168202 A1     May 28, 2020

(30) Foreign Application Priority Data

Nov. 27, 2018 (KR) .................. 10-2018-0148775

(51) Int. Cl.
| | |
|---|---|
| *G10L 13/02* | (2013.01) |
| *G10L 13/027* | (2013.01) |
| *G06K 9/62* | (2022.01) |
| *H04N 5/235* | (2006.01) |
| *G06V 20/52* | (2022.01) |

(52) U.S. Cl.
CPC .......... *G10L 13/027* (2013.01); *G06K 9/6201* (2013.01); *G06V 20/52* (2022.01); *H04N 5/2355* (2013.01)

(58) Field of Classification Search
CPC ............. G10L 13/027; G06K 9/00771; G06K 9/6201; G06K 9/00724; G06K 9/6274; G06K 9/6288; H04N 5/2355; H04N 21/4394; H04N 21/44008;

(Continued)

(56) References Cited

U.S. PATENT DOCUMENTS

| | | |
|---|---|---|
| 8,966,513 B2 | 2/2015 | John et al. |
| 9,262,521 B2 | 2/2016 | Kim et al. |

(Continued)

FOREIGN PATENT DOCUMENTS

| | | |
|---|---|---|
| JP | 2015-5940 A | 1/2015 |
| KR | 10-1796580 B1 | 11/2017 |
| KR | 10-2018-0013325 A | 2/2018 |

OTHER PUBLICATIONS

International Search Report (PCT/ISA/210) and Written Opinion (PCT/ISA/237) dated Feb. 21, 2020 issued by the International Searching Authority in International Application No. PCT/KR2019/015131.

*Primary Examiner* — Qian Yang

(74) *Attorney, Agent, or Firm* — Sughrue Mion, PLLC

(57) ABSTRACT

Provided are an electronic device and an operation method thereof. The electronic device may include a memory storing one or more instructions, and a processor configured to execute the one or more instructions stored in the memory to: analyze a meaning of a speech section in audio data included in a content being played on the electronic device, based on an analysis result of the speech section, identify, from among a plurality of image frames included in the content, an image candidate section for generating a highlight image, analyze an object included in an image frame corresponding to the image candidate section, and identify a target section for generating the highlight image based on an analysis result of the image candidate section.

19 Claims, 18 Drawing Sheets

(58) Field of Classification Search
CPC ......... H04N 21/47217; H04N 21/8549; H04N 21/42203; H04N 5/144
See application file for complete search history.

(56) References Cited

U.S. PATENT DOCUMENTS

| | | |
|---|---|---|
| 2006/0059120 A1 | 3/2006 | Xiong et al. |
| 2016/0247328 A1 | 8/2016 | Han et al. |
| 2018/0035075 A1 | 2/2018 | Lee et al. |

ELECTRONIC DEVICE AND OPERATION METHOD THEREOF

CROSS-REFERENCE TO RELATED APPLICATION(S)

This application is based on and claims priority under 35 U.S.C. § 119 to Korean Patent Application No. 10-2018-0148775, filed on Nov. 27, 2018, in the Korean Intellectual Property Office, the disclosure of which is incorporated by reference herein in its entirety.

BACKGROUND

1. Field

The disclosure relates to an electronic device and an operation method thereof, and more particularly, to an electronic device that generates and provides a highlight image in real time and an operation method thereof.

2. Description of Related Art

Display apparatuses display images viewable by users. The users may view broadcast through the display apparatuses. Such display apparatuses display, on their displays, broadcast selected by the users from among broadcast signals transmitted from broadcasting stations. Broadcast has been recently changed from analog broadcast into digital broadcast all over the world.

The digital broadcast transmits digital images and audio signals. Compared with the analog broadcast, the digital broadcast is robust to external noise and thus has advantages such as low data loss, easy error correction, high resolution, and a clear screen. In addition, unlike the analog broadcast, the digital broadcast may provide bi-directional services.

In addition to a digital broadcast function, a smart TV providing various contents is provided. The smart TV aims at analyzing and providing what a user desires without an operation of the user, rather than manually operating according to a selection of the user.

Recently, there has been a demand for a method of generating and providing a highlight image to a user in real time while the user views content.

SUMMARY

Provided are an electronic device that provides a highlight image and an operation method thereof.

Additional aspects will be set forth in part in the description which follows and, in part, will be apparent from the description, or may be learned by practice of the presented embodiments of the disclosure.

According to an embodiment of the disclosure, an electronic device includes a memory storing one or more instructions, and a processor configured to execute the one or more instructions stored in the memory to: analyze a meaning of a speech section in audio data included in a content being played on the electronic device, based on an analysis result of the speech section, identify, from among a plurality of image frames included in the content, an image candidate section for generating a highlight image, analyze an object included in an image frame corresponding to the image candidate section, and identify a target section for generating the highlight image based on an analysis result of the image candidate section.

The processor may be further configured to execute the one or more instructions to generate the highlight image based on the identified target section, and overlap and reproduce the generated highlight image on the content being played when the highlight image is generated.

The processor may be further configured to execute the one or more instructions to: analyze sound wave characteristics of the audio data included in the content being played.

The processor may be further configured to execute the one or more instructions to determine whether a predetermined keyword is included in the speech section.

The processor may be further configured to execute the one or more instructions to adjust a time distance for identifying the image candidate section according to a weight of a predetermined keyword in the speech section.

The electronic device may include a microphone, and the processor may be further configured to execute the one or more instructions to analyze external audio data input from outside the electronic device through the microphone.

When a first image candidate section in the plurality of image frames and a second image candidate section in the plurality of image frames overlap at least partially, the processor may be further configured to execute the one or more instructions to identify the image candidate section based on a comparison between a first weight of a first keyword corresponding to the first image candidate section and a second weight of a second keyword corresponding to the second image candidate section.

The processor may be further configured to execute the one or more instructions to detect the object included in the image frame corresponding to the image candidate section and calculate a motion variation amount of the detected object.

The processor may be further configured to execute the one or more instructions to generate the highlight image based on the identified target section, display an interface requesting a user input as to whether to display the generated highlight image when the highlight image is generated, in response to the user input, overlap and reproduce the highlight image on the content being played, and reset a weight of a keyword corresponding to the reproduced highlight image.

The processor may be further configured to execute the one or more instructions to control the display to display a list comprising one or more highlight images generated from the content being played.

According to another embodiment of the disclosure, an operation method of an electronic device includes analyzing a meaning of a speech section in audio data included in a content being played on the electronic device, based on an analysis result of the speech section, identifying, from among a plurality of image frames included in the content, an image candidate section for generating a highlight image; analyzing an object included in an image frame corresponding to the image candidate section, and identifying a target section for generating the highlight image based on an analysis result of the image candidate section.

According to another embodiment of the disclosure, a non-transitory computer-readable recording medium having recorded thereon a program for executing the method on a computer is provided.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
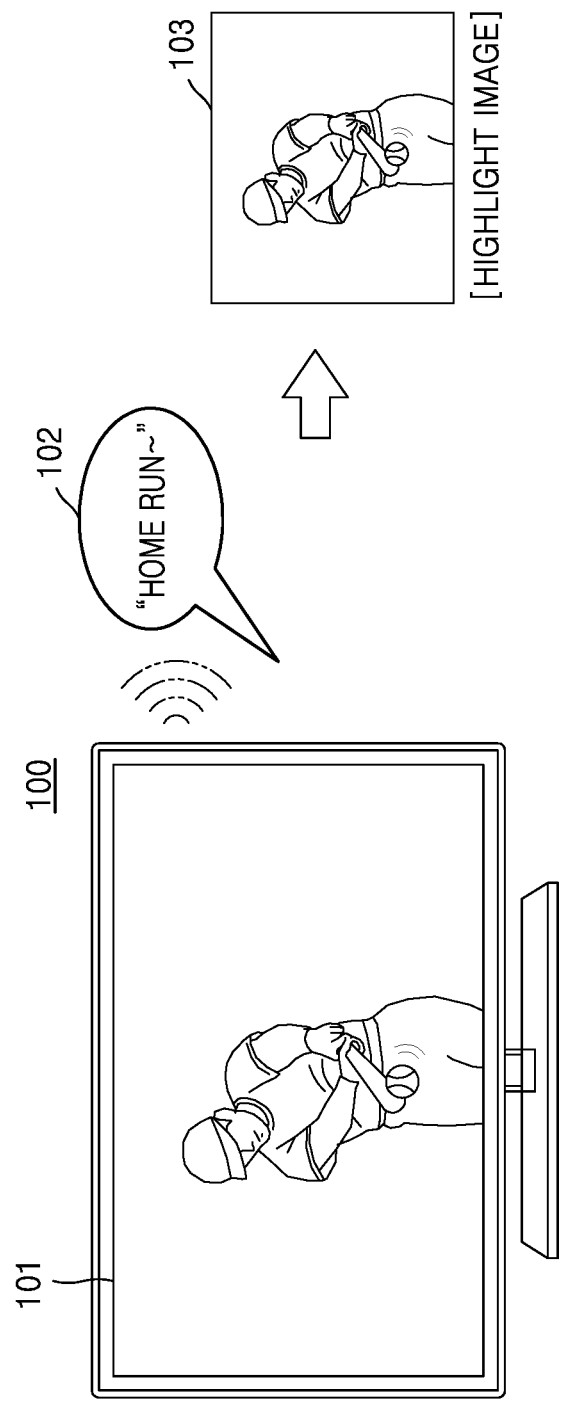
FIG. 1 is a schematic view for explaining an embodiment of the disclosure.

The disclosure will now be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those of skill in the art. For clarity, portions that are not relevant to the description of the disclosure are omitted, and like reference numerals in the drawings denote like elements.

The terms used in this specification are those general terms currently widely used in the art in consideration of functions regarding the disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple names but based on the meaning of the terms and the overall description of the disclosure.

While such terms as "first", "second", etc., may be used to describe various components, such components must not be limited to the above terms. The above terms are used only to distinguish one component from another.

The terms used in the present specification are merely used to describe particular embodiments of the disclosure, and are not intended to limit the disclosure. An expression used in the singular encompasses the expression of the plural, unless it has a clearly different meaning in the context. It will be understood that when region is referred to as being "connected to" another region, the region may be directly connected to the other region or electrically connected thereto with an intervening region therebetween. It will be further understood that the terms "comprises" and/or "comprising" used herein specify the presence of stated features or components, but do not preclude the presence or addition of one or more other features or components.

The use of the terms "a" and "an" and "the" and similar referents in the context of describing the disclosure are to be construed to cover both the singular and the plural. Also, when a specific process order is not clearly stated, described processes may be performed in an appropriate order. Processes described in the disclosure are not limited to the described order.

Phrases such as "in an embodiment" and "in an embodiment" in the present specification do not indicate the same embodiment of the disclosure.

The disclosure may be described in terms of functional block components and various processing steps. Some or all functional blocks may be realized as any number of hardware and/or software components configured to perform the specified functions. For example, the functional blocks may be realized by at least one micro-processor or circuits for performing certain functions. Also, the functional blocks may be realized with any programming or scripting language. The functional blocks may be realized in the various algorithms that are executed on one or more processors. Furthermore, the disclosure could employ any number of conventional techniques for electronics configuration, signal processing and/or control, data processing and the like. The words "mechanism", "element", "means", and "configuration" are used broadly and are not limited to mechanical or physical embodiments of the disclosure.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Throughout the disclosure, the expression "at least one of a, b or c" indicates only a, only b, only c, both a and b, both a and c, both b and c, all of a, b, and c, or variations thereof.

Hereinafter, the disclosure will be described in detail with reference to the attached drawings.

FIG. 1 is a schematic view for explaining an embodiment of the disclosure.

An electronic device 100 according to an embodiment of the disclosure may analyze a meaning of a speech included in content being reproduced to identify a section to be generated as a highlight image (for example, a slow motion image) in the content and automatically generate and provide the highlight image.

As shown in FIG. 1, while the electronic device 100 (e.g., a smart TV) provides baseball relay broadcast content 101, when a speech of "home run" 102 is analyzed from the broadcast content 101, a section including the speech of "home run" 102 may be generated as a highlight image 103.

According to an embodiment of the disclosure, while viewing the content, a user may view a highlight image including an important scene generated from the content being viewed together on a part of a display screen. For example, while the user views a baseball relay broadcast on an electronic device (e.g., a smart TV), when a home run scene appears in the broadcast, the user may continuously view a slow motion image including the home run scene, which is automatically provided to a display in a picture in picture (PIP).

According to an embodiment of the disclosure, the electronic device 100 may automatically generate a highlight image (e.g., a slow motion image) in the electronic device 100, without interworking with an external server. Accordingly, the user may view the highlight image in almost real time without delay after an important scene has passed while viewing the content.

According to an embodiment of the disclosure, the electronic device 100 may identify a significant target section to be generated as a highlight image more accurately by analyzing a linguistic meaning of a speech section included in the content.

For example, according to analysis of audio characteristics of audio data in a baseball relay broadcast, even though a loud shout of a crowd is detected, for example, when a speech such as 'foul' or 'missing', etc. is analyzed, an image candidate section may be filtered not to be the target section to be generated as the highlight image. Accordingly, an image processing process on a filtered image candidate section may be terminated, and thus a load necessary for image processing may be reduced.

Meanwhile, the electronic device 100 according to an embodiment of the disclosure may analyze the linguistic meaning of a speech section included in the audio data using a trained model trained by using an artificial intelligence algorithm.

The trained model may be constructed considering an application field of the trained model, a purpose of training, or the computer performance of a device. The trained model may be, for example, a neural network-based model. For example, a model such as a Recurrent Neural Network (RNN), a Deep Neural Network (DNN), and a Bidirectional Recurrent Deep Neural Network (BRDNN) may be used as the trained model, but is not limited thereto.

Figure 3:
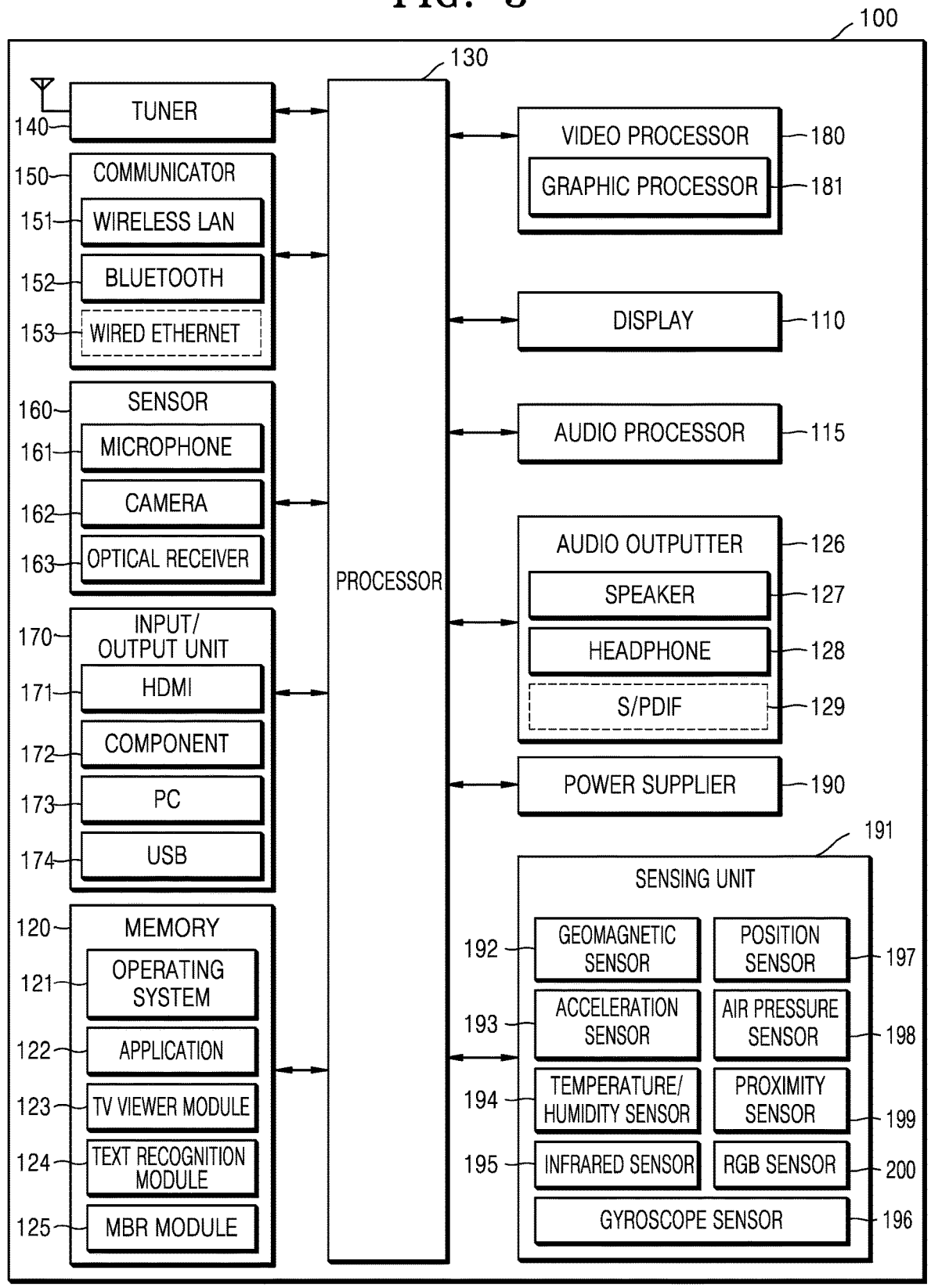
FIG. 3 is a block diagram of an electronic device according to an embodiment of the disclosure.

The electronic device 100 according to an embodiment of the disclosure may be implemented as an electronic device 110 including a display 110 as shown in FIG. 3.

The electronic device 100 according to an embodiment of the disclosure may be, but is not limited to, a TV. For example, the electronic device 100 may be implemented as various electronic devices such as a desktop, a tablet PC, a laptop computer, a mobile phone, an electronic book terminal, a digital broadcast terminal, a Personal Digital Assistants (PDA), a Portable Multimedia Player (PMP), navigation, a digital camera, a camcorder, an MP3 player, a wearable device, and the like. Also, the electronic device 100 may be a fixed type or mobile type, and may be a digital broadcast receiver capable of receiving digital broadcast.

Also, the electronic device 100 according to an embodiment of the disclosure may be implemented as a curved display device having a curvature or a flexible display device capable of adjusting the curvature as well as a flat display device. The output resolution of the electronic device 100 may include, for example, High Definition (HD), Full HD, Ultra HD, or Ultra HD, or a resolution that is clearer than Ultra HD.

FIG. 1 is provided for the purpose of explaining an embodiment of the disclosure and the disclosure is not limited thereto.

A more specific method of generating a highlight image performed an electronic device according to an embodiment of the disclosure will be described in more detail in descriptions of FIGS. 4 to 10 later.

Figure 2:
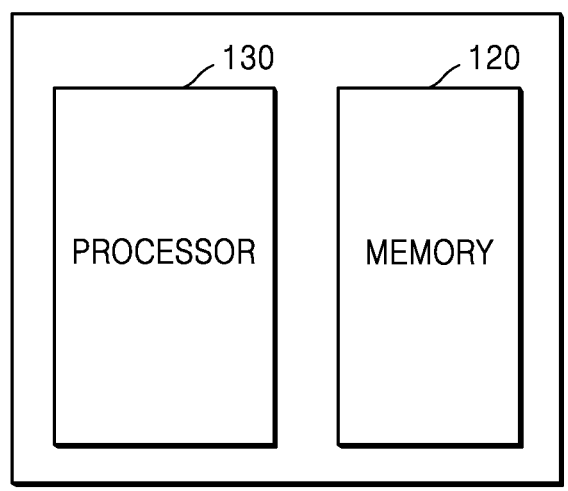
FIG. 2 is a block diagram of an electronic device according to an embodiment of the disclosure.

FIG. 2 is a block diagram of the electronic device 100 according to an embodiment of the disclosure. FIG. 3 is a block diagram of the electronic device 100 according to an embodiment of the disclosure.

As shown in FIG. 2, the electronic device 100 according to an embodiment of the disclosure may include a memory 120 and a processor 130. However, all illustrated components are not indispensable components. The electronic device 100 may be implemented by more components than the illustrated components, and the electronic device 100 may be implemented by less components than the illustrated components.

For example, as shown in FIG. 3, the electronic device 100 according to an embodiment of the disclosure may further include a display 110, a tuner 140, a communicator 150, a detector 160, an inputter/outputter 170, a video processor 180, an audio processor 115, an audio outputter 126, a power supplier 190, and a sensing unit 191 in addition to the memory 120 and the processor 130.

The electronic device 100 of FIG. 3 may be an embodiment of the electronic device 100 of FIGS. 1 and 2.

Hereinafter, the components of the electronic device 100 will be described.

The processor 130 controls the overall operation of the electronic device 100 and the flow of a signal between internal components of the electronic device 100 and processes data. When a user input is received or a stored predetermined condition is satisfied, the processor 130 may run an operating system (OS) and various applications stored in the memory 120.

The processor 130 may include a RAM that stores a signal or data input from the outside of the electronic device 100 or is used as a storage region corresponding to various jobs performed by the electronic device 100, an ROM in which a control program for controlling the electronic device 100 is stored, and a processor.

The processor 130 may include a graphic processing unit (not shown) for graphic processing corresponding to a video. The processor 130 may be implemented as a System On Chip (SoC) incorporating a core (not shown) and a GPU (not shown). The processor 130 may include a single core, a dual core, a triple core, a quad core, and multiple cores thereof.

Also, the processor 130 may include a plurality of processors. For example, the processor 130 may be implemented as a main processor (not shown) and a sub processor (not shown) operating in a sleep mode.

According to an embodiment of the disclosure, the processor 130 may analyze a meaning of a speech section in audio data included in content being played back by executing one or more instructions stored in the memory 120. Further, according to an embodiment of the disclosure, the processor 130 may determine whether a predetermined keyword is included in the speech section by executing the one or more instructions stored in the memory 120.

According to an embodiment of the disclosure, the processor 130 may analyze the linguistic meaning of the speech section and identify a section including the predetermined keyword as a candidate image section to generate a highlight image, thereby providing a scene that is more important than the flow of the content as the highlight image.

Also, according to an embodiment of the disclosure, as a keyword is set according to a type of content, an image frame that is more suitable for each type of content may be generated as the highlight image.

Also, upon analyzing the keyword, a weight of the keyword may be used, and thus an image frame having high interest of the user may be generated as the highlight image.

Further, according to an embodiment of the disclosure, the processor 130 may analyze sound wave characteristics of the audio data included in the content being played back by executing the one or more instructions stored in the memory 120.

Further, according to an embodiment of the disclosure, the processor 130 may analyze external audio data input from the outside through a microphone 161 (FIG. 3), by executing the one or more instructions stored in the memory 120.

According to an embodiment of the disclosure, a more significant image frame having high interest of the user may be generated as the highlight image by analyzing a speech of a viewer who is viewing the content.

Further, according to an embodiment of the disclosure, the processor 130 may identify the image candidate section for generating the highlight image among a plurality of image frames included in the content based on an analysis result of the speech section by executing the one or more instructions stored in the memory 120.

Also, according to an embodiment of the disclosure, the processor 130 may identify the image candidate section based on a comparison between a first weight of a first keyword corresponding to a first image candidate section of the plurality of image frames and a second weight of a second keyword corresponding to a second image candidate section of the plurality of image frames when the first image candidate section and the second image candidate section at least partially overlap by executing the one or more instructions stored in the memory 120.

According to an embodiment of the disclosure, when a plurality of image candidate sections are extracted, the processor 130 may identify the image candidate section again considering a weight of a keyword corresponding to each image candidate section, thereby generating the highlight image reflecting interest of the user.

Also, according to an embodiment of the disclosure, the processor 130 may analyze an object included in an image frame corresponding to the image candidate section by executing the one or more instructions stored in the memory 120. Also, according to an embodiment of the disclosure, the processor 130 may detect the object included in the image frame corresponding to the image candidate section and calculate a motion variation amount of the detected object by executing the one or more instructions stored in the memory 120.

According to an embodiment of the disclosure, the processor 130 may generate a more significant image frame in relation to the object as the highlight image by considering a motion change of an object extracted from an image, through not only a speech analysis but also an image analysis.

Further, according to an embodiment of the disclosure, the processor 130 may identify a target section for generating the highlight image based on the analysis result of the image candidate section by executing the one or more instructions stored in the memory 120. Further, according to an embodiment of the disclosure, the processor 130 may generate the highlight image based on the identified target section by executing the one or more instructions stored in the memory 120.

Further, according to an embodiment of the disclosure, the processor 130 may overlap and reproduce the generated highlight image on the content being played back by executing the one or more instructions stored in the memory 120 as the highlight image is generated.

According to an embodiment of the disclosure, the highlight image may be automatically provided to the display 110 as the highlight image is generated, and thus the user may confirm the highlight image including an important scene in real time while viewing the content without any additional control operation.

Further, according to an embodiment of the disclosure, the processor 130 may display an interface for requesting a user input as to whether to display the generated highlight image as the highlight image is generated by executing the one or more instructions stored in the memory 120. Further, according to an embodiment of the disclosure, the processor 130 may overlap and reproduce the highlight image on the content being played back in response to the user input by executing the one or more instructions stored in the memory 120. Further, according to an embodiment of the disclosure, the processor 130 may reset a weight of a keyword corresponding to the reproduced highlight image by executing the one or more instructions stored in the memory 120.

According to an embodiment of the disclosure, a weight of a keyword included in the highlight image may be reset to be high with respect to the highlight image selected and reproduced by the user, and thus the reset high weight may be applied upon a later keyword analysis for generating the highlight image. Accordingly, a user-customized highlight image reflecting interest of the user may be provided.

Also, according to an embodiment of the disclosure, the processor 130 may control the display 110 to display a list containing one or more highlight images generated from the content being played back, by executing the one or more instructions stored in the memory 120.

According to an embodiment of the disclosure, the user may select a highlight image to view again by collecting and providing one or more highlight images generated from one piece of content as a list. Thus, a viewing environment with the improved user convenience may be provided.

The memory 120 may store various data, programs, or applications for driving and controlling the electronic device 100 under the control of the processor 130. The memory 120 may store input/output signals or data corresponding to the driving of the video processor 180, the display 110, the audio processor 115, the audio outputter 126, the power supplier 130, a tuner 140, the communicator 150, the detector 160, and the inputter/outputter 170.

The memory 120 may store an operating system 121 for control of the electronic device 100 and the processor 130, an application 122 that is originally provided by a manufacturer or is downloaded from an external source, a graphical user interface (GUI) related to the application 122, an object (e.g., an image text, an icon, a button, etc.) for providing the GUI, user information, documents, databases, or related data.

Also, the memory 120 may receive a TV viewer module 123 including one or more instructions for receiving an input signal from a remote control device (not shown) and thereby performing channel control corresponding to the input signal or entering a channel scroll user interface mode when the input signal corresponds to a predefined input, a text recognition module 124 including one or more instructions for recognizing information from content received from an external device (not shown), and an MBR module 125 including one or more instructions for channel control from the external device (not shown).

The memory 120 includes a ROM, a RAM, or a memory card (e.g., a micro SD card, a USB memory, not shown) mounted on the electronic device 100. The memory 120 may also include non-volatile memory, volatile memory, a hard disk drive (HDD), or a solid state drive (SSD).

According to an embodiment of the disclosure, the memory 120 may include at least one type storage medium of a flash memory type, a hard disk type, a multimedia card micro type, a card type memory (e.g., SD or XD memory, etc.), random access memory (RAM), static random access memory (SRAM), read only memory (ROM), electrically erasable programmable read-only memory (EEPROM), programmable read-only memory (PROM), a magnetic memory, a magnetic disk, and an optical disk.

Figure 10:
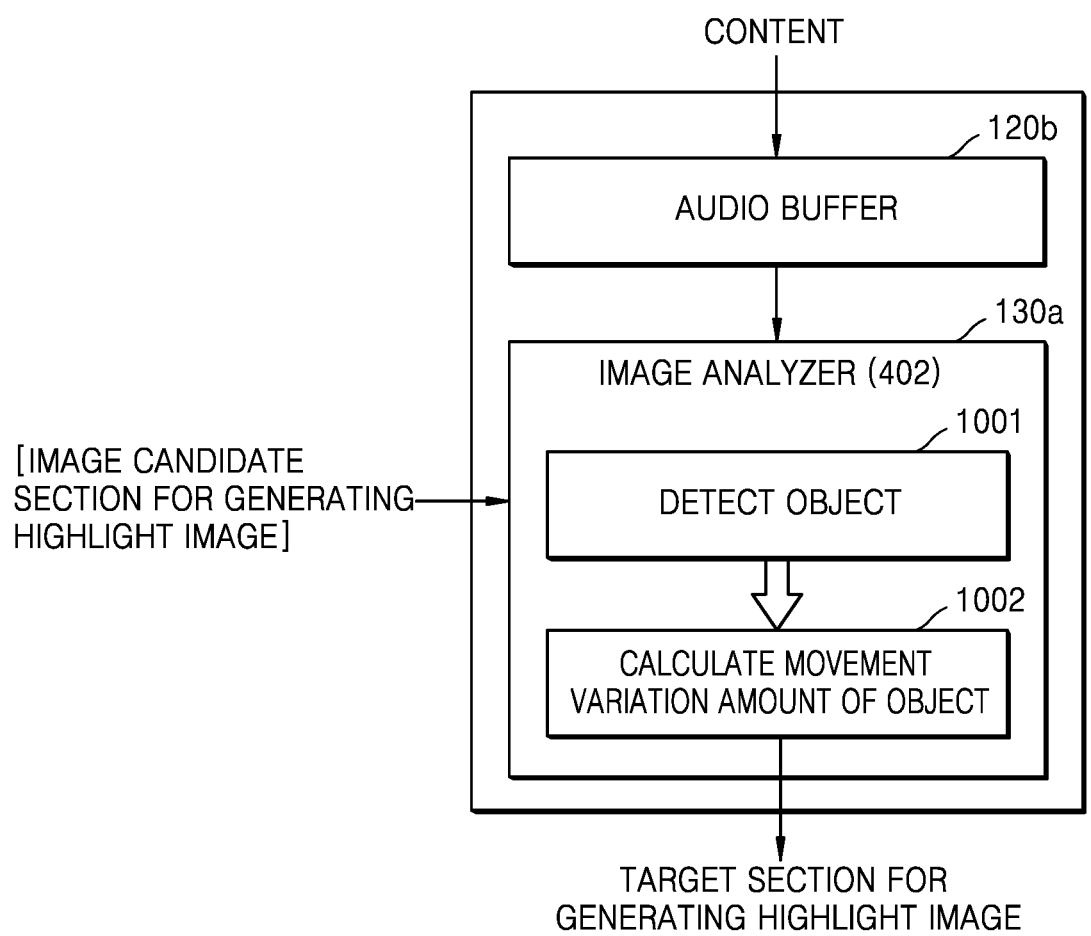
FIG. 10 is a diagram for explaining an example of identifying a target section according to an embodiment of the disclosure.

According to an embodiment of the disclosure, the memory 120 may include an audio buffer 120a (FIG. 6) and a video buffer 120b (FIG. 10).

According to an embodiment of the disclosure, the audio buffer 120a (FIG. 6) may store part of audio data included in the content being played back. Also, according to an embodiment of the disclosure, the video buffer 120b (FIG. 10) may store part of image data included in the content being played back.

The display 110 may display video included in a broadcast signal received through the tuner 140 (FIG. 3) under the control of the processor 130 on a screen. Also, the display 110 may display content (e.g., a moving image) input through the communicator 150 or the inputter/outputter 170. The display 110 may output an image stored in the memory 120 under the control of the processor 130.

The display 110 may generate a driving signal by converting an image signal, a data signal, an on-screen display (OSD) signal, a control signal, or the like which are processed by the processor 130. The display 110 may be embodied as a plasma display panel (PDP), a liquid crystal display (LCD), an organic light-emitting display (OLED), a flexible display, or the like, and may also be embodied as a three-dimensional (3D) display. The display 110 may be configured as a touch screen to be used as both an output device and an input device.

According to an embodiment of the disclosure, the display 110 of the electronic device 100 may be implemented as a plasma display panel (PDP), a liquid crystal display (LCD), an organic light emitting diode (OLED), a cathode ray tube or the like.

According to an embodiment of the disclosure, the display 110 may display the content being played back.

Further, according to an embodiment of the disclosure, the display 110 may display a highlight image.

Further, according to an embodiment of the disclosure, the display 110 may overlap and display the highlight image on the content being played back.

According to an embodiment of the disclosure, the user may simultaneously view the highlight image generated from the content being viewed while viewing the content.

Further, according to an embodiment of the disclosure, the display 110 may display a list including one or more highlight images.

The tuner 140 may tune and select a frequency of a channel that a user wants to receive via the electronic device 100, where the frequency is obtained by tuning, via amplification, mixing, and resonance, frequency components of a broadcasting signal that is received in a wired or wireless manner. The broadcasting signal includes an audio signal, a video signal, and additional information (e.g., an electronic program guide (EPG)).

The tuner 140 may receive a broadcast signal in a frequency domain corresponding to a channel number according to a user input (for example, a control signal received from a remote control device (not shown), e.g., a channel number input, a channel up-down input, and a channel input in an EPG screen).

The tuner 140 may receive broadcast signals from various sources such as terrestrial broadcast, cable broadcast, satellite broadcast, Internet broadcast, and the like. The tuner 140 may receive a broadcast signal from a source such as analog broadcast or digital broadcast. The broadcast signal received through the tuner 140 may be decoded (for example, audio decoding, video decoding, or additional information decoding) and separated into audio, video and/or additional information. The separated audio, video and/or additional information may be stored in the memory 120 under the control of the processor 130.

The tuner 140 of the electronic device 100 may be one or plural. The tuner 140 may be implemented as an all-in-one with the electronic device 100 or may be a separate device (e.g., a set-top box) having a tuner that is electrically connected to the electronic device 100, and a tuner (not shown) connected to the inputter/outputter 170.

The communicator 150 may connect the electronic device 100 to an external device (e.g., an audio device, etc.) (not shown) under the control of the processor 130. The processor 130 may transmit/receive content to/from the external device (not shown) connected through the communicator 150, download an application from the external device (not shown), or perform web browsing. The communicator 150 may include one of a wireless LAN 151, a Bluetooth 152, and a wired Ethernet (Ethernet) 153 according to a performance and a structure of the electronic device 100. The communicator 150 may include a combination of the wireless LAN 151, the Bluetooth 152, and the wired Ethernet (Ethernet) 153.

Further, the communicator 150 may receive the control signal of the remote control device (not shown) under the control of the processor 130. The control signal may be implemented as a Bluetooth type, an RF signal type, or a WiFi type.

The communicator 150 may further include a near field communication (for example, near field communication (NFC), not shown) and a Bluetooth low energy (not shown) other than Bluetooth.

The detector 160 may detect a speech of the user, an image of the user, or an interaction of the user and include a microphone 161, a camera 162, and a light receiver 163.

The microphone 161 receives an utterance speech of the user. The microphone 161 may convert the received speech into an electric signal and output the electric signal to the processor 130. The speech of the user may include, for example, a speech corresponding to a menu or a function of the electronic device 100.

According to an embodiment of the disclosure, the microphone 161 may collect outside sound including the speech of the user viewing the content.

Also, according to an embodiment of the disclosure, the microphone 161 may receive a speech command of the user.

The camera 162 may obtain an image frame such as a still image or a moving image. An image captured through an image sensor may be processed through the processor 130 or a separate image processor (not shown).

The image frame processed by the camera 162 may be stored in the memory 120 or transmitted to the outside through the communicator 150. The camera 162 may include two or more cameras according to a structure of the electronic device 100.

The light receiver 163 receives an optical signal including a control signal received from an external remote control device (not shown). The light receiver 163 may receive the optical signal corresponding to a user input (e.g., touch, press, touch gesture, speech, or motion) from the remote control device (not shown). The control signal may be extracted from the received optical signal under the control of the processor 130. For example, the light receiver 163 may receive a control signal corresponding to a channel up/down button for channel switching from the remote controller (not shown).

The inputter/outputter 170 outputs video (e.g., a moving image and the like), audio (e.g., speech, music and the like) and additional information (e.g., EPG, etc.) from outside the electronic device 100 under the control of the processor 130. The inputter/outputter 170 may include at least one of a high-definition multimedia interface (HDMI) port 171, a component jack 172, a PC port 173, or a USB port 174. The inputter/outputter 170 may include at least one combination of the HDMI port 171, the component jack 172, the PC port 173, or the USB port 174. An external image providing device (not shown) may be connected through the HDMI port 171.

The video processor 180 performs processing on video data received by the electronic device 100. The video processor 180 may include a graphic processor 181 and perform various kinds of image processing such as decoding, scaling, noise filtering, frame rate conversion, resolution conversion, and the like on the video data.

The graphic processor 181 generates a screen including various objects such as an icon, an image, a text, etc. using an operator (not shown) and a renderer (not shown). The operator (not shown) calculates attribute values such as a coordinate value, a shape, a size, and a color to be displayed by each of the objects according to a layout of the screen using the user input detected through the detector 160. The renderer (not shown) generates screens of various layouts including the objects based on the attribute values calculated by the operator (not shown). The screens generated by the renderer (not shown) are displayed within a display region of the display 110.

The audio processor 115 performs processing on audio data. The audio processor 115 may perform various kinds of processing such as decoding and amplification, noise filtering, and the like on the audio data. Meanwhile, the audio processor 115 may include a plurality of audio processing modules for processing audio corresponding to a plurality of contents.

The audio outputter 126 outputs audio included in the broadcast signal received through the tuner 140 under the control of the processor 130. The audio outputter 126 may output audio (e.g., speech or sound) input through the communicator 150 or the inputter/outputter 170. The audio outputter 126 may also output audio stored in the memory 120 under the control of the processor 130. The audio outputter 126 may include at least one of a speaker 127, a headphone output terminal 128, or a Sony/Philips Digital Interface (S/PDIF) output terminal 129. The audio outputter 126 may include at least one combination of the speaker 127, the headphone output terminal 128, or the S/PDIF output terminal 129.

The power supplier 190 supplies power to the internal components of the electronic device 100 from an external power source under the control of the processor 130. Also, the power supplier 190 may supply power output from one or more batteries (not shown) located inside the electronic device 100 to the internal components under the control of the processor 130.

The sensing unit 191 may sense a state of the electronic device 100 or a state around the electronic device 100 and may transmit sensed information to the processor 130.

The sensing unit 191 includes a magnetic sensor 192, an acceleration sensor 193, a temperature humidity sensor 194, an infrared sensor 195, a gyroscope sensor 196, a location sensor (e.g. a GPS) 197, an air pressure sensor 198, a proximity sensor 199, and an RGB sensor (illuminance sensor) 200 but is not limited thereto. Functions of respective sensors may be intuitively inferred and thus, detailed descriptions thereof will be omitted.

Further, the electronic device 100 including the display 110 may be electrically connected to a separate external device (e.g., a set-top box, not shown) including the tuner 140.

Also, the electronic device 100 may be implemented as an analog TV, a digital TV, a 3D-TV, a smart TV, an LED TV, an OLED TV, a plasma TV, a monitor, etc. but is not limited thereto. It will be easily understood by one of ordinary skill in the art.

Meanwhile, the block diagrams of the illustrated electronic devices 100 are block diagrams for an embodiment of the disclosure. Each component of the block diagrams may be integrated, added, or omitted, according to the specifications of the actual implementation of the electronic device 100. That is, two or more components may be combined into one component, or one component may be subdivided into two or more components when necessary. Furthermore, a function performed in each block is for the purpose of explaining the embodiment of the disclosure, and a specific operation or device thereof does not limit the scope of the disclosure.

Figure 4:
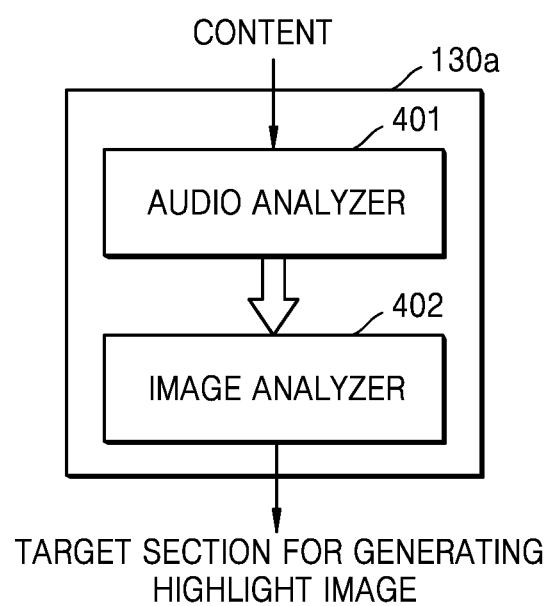
FIG. 4 is a block diagram of a processor according to an embodiment of the disclosure.

FIG. 4 is a block diagram of a processor 130*a* according to an embodiment of the disclosure.

The processor 130*a* of FIG. 4 may be an embodiment of the processor 130 of FIGS. 2 and 3.

According to an embodiment of the disclosure, the processor 130*a* may include an audio analyzer 401 and an image analyzer 402.

The audio analyzer 401 according to an embodiment of the disclosure may analyze the linguistic meaning of a speech section of audio data included in content being played back. Also, the audio analyzer 401 according to an embodiment of the disclosure may identify an image candidate section for generating a highlight image among a plurality of image frames included in the content, based on an analysis result of the speech section.

The image analyzer 402 according to an embodiment of the disclosure may analyze an object included in an image frame corresponding to the image candidate section. Also, the image analyzer 402 according to an embodiment of the disclosure may identify a target section for generating the highlight image, based on an analysis result of the image candidate section.

According to an embodiment of the disclosure, the audio analyzer 401 may analyze audio from the audio data included in the content being played back in the electronic device 100 and identify the image candidate section based on the audio analysis result. Also, the image analyzer 402 that obtained the identified image candidate section may analyze an image from an image frame included in the image candidate section to identify the target section for generating the highlight image.

The block diagram of the processor 130a of FIG. 4 is a block diagram for an embodiment of the disclosure. The components of the processor 130a are not limited to the audio analyzer 401 and the image analyzer 402 shown as components of the block diagram, but may be integrated, added, or omitted according to specifications of the actual implementation of the electronic device 100. That is, two or more components may be combined into one component, or one component may be subdivided into two or more components when necessary. Also, some components may be implemented as an external device (not shown) connectable with the electronic device 100.

Figure 5:
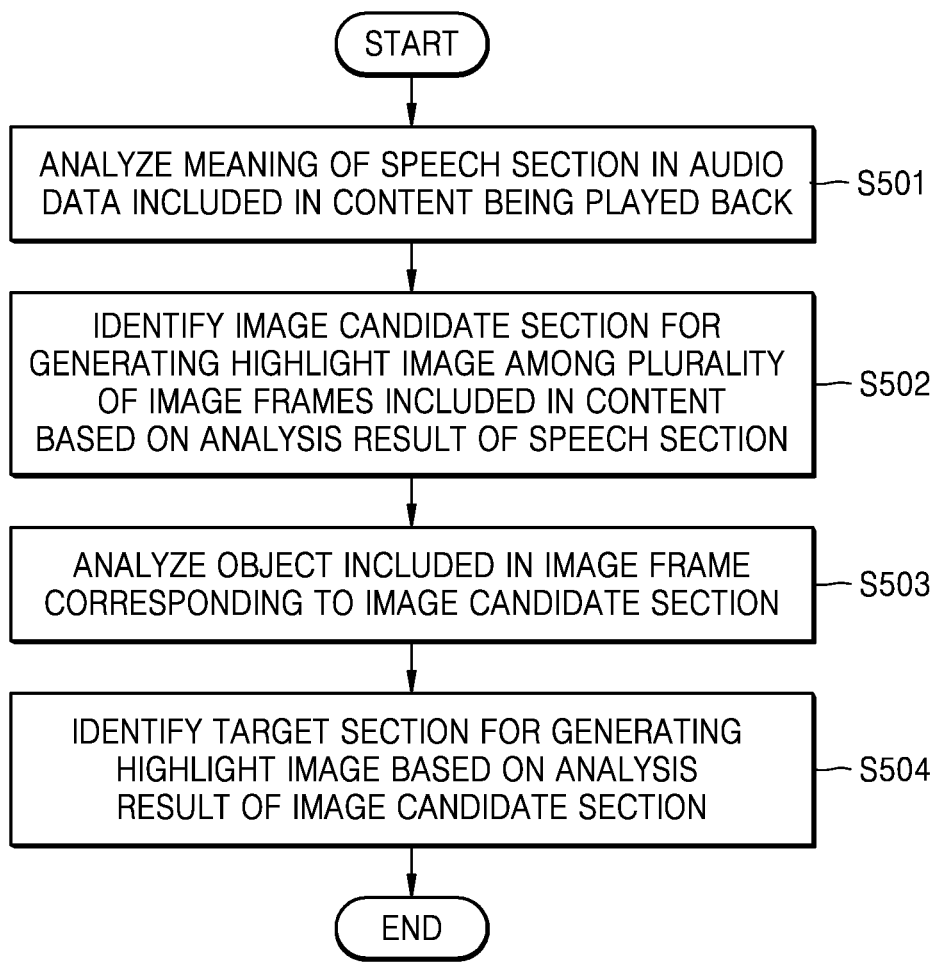
FIG. 5 is a flowchart of an operation method of an electronic device according to an embodiment of the disclosure.

FIG. 5 is a flowchart of an operation method of the electronic device 100 according to an embodiment of the disclosure.

In operation S501 of FIG. 5, the electronic device 100 according to an embodiment of the disclosure may analyze the meaning of a speech section of audio data included in content being played back.

According to an embodiment of the disclosure, the audio data may include a speech having a linguistic meaning and sound (e.g., music, a shout of crowd, etc.) other than the speech.

The electronic device 100 according to an embodiment of the disclosure may extract significant words, sentences, and the like through a language analysis of the speech section in the audio data. For example, as a result of analyzing audio data in a baseball game, words having meaning such as 'home run' and 'score' may be analyzed.

In operation S502, the electronic device 100 according to an embodiment of the disclosure may identify an image candidate section for generating a highlight image among a plurality of image frames included in the content, based on an analysis result of the speech section.

According to an embodiment of the disclosure, the electronic device 100 may identify an image frame section including a word having a meaning such as 'home run', 'score' or the like as the image candidate section.

According to an embodiment of the disclosure, the image candidate section may be a candidate section for generating the highlight image and may mean a section identified as a significant section through audio analysis and including an image frame on which image analysis is to be proceeded.

For example, by analyzing an audio data in a baseball game content, an image frame section from which a speech having a meaning such as 'foul', 'missing', etc. is analyzed may be identified not to be an important scene and, a processing with the image analysis on the image frame section may be terminated. On the other hand, when the meaning such as 'home run', 'score' or the like is analyzed as a result of analyzing the audio data, a section including a speech such as 'home run', 'score' or the like may be identified as the image candidate section and the image analysis may be performed.

In another embodiment of the disclosure, by analyzing audio data in a baseball game content, an image frame section from which a speech having a meaning such as 'hit' is detected may be identified as a start time of the image candidate section for generating the highlight image, whereas the image frame section from which a speech having the meaning such as 'foul', 'missing', etc., is continuously analyzed within a predetermined period of time may be identified not to be an important scene and, a processing with the image analysis may be terminated. On the other hand, by analyzing audio data in a baseball game content, an image frame section from which the speech having the meaning such as 'hit' is detected may be identified as the start time of the image candidate section for generating the highlight image, and the image frame section from which a speech having the meaning such as 'home run', 'score' or the like is continuously analyzed within the predetermined period of time, the section including the speeches such as 'hit', 'home run', 'score', etc. may be identified as the image candidate section, and the video analysis may be performed.

In operation S503, the electronic device 100 according to an embodiment of the disclosure may analyze an object included in the image frame corresponding to the image candidate section.

According to an embodiment of the disclosure, the electronic device 100 may detect a predetermined object from the image frame included in the image candidate section. For example, a baseball bat and a baseball ball may be detected from baseball relay broadcast content.

Further, according to an embodiment of the disclosure, the electronic device 100 may calculate a motion variation amount of the detected object. For example, the a motion variation amount may be calculated by detecting the baseball bat and the baseball from the baseball relay broadcast content and tracking movements of the detected baseball bat and baseball ball. For example, the electronic device 100 may calculate the motion variation amount of the object by detecting moving speed, acceleration, and moving directions of the baseball bat and the baseball ball through image analysis.

In operation S504, the electronic device 100 according to the embodiment of the disclosure may identify a target section for generating the highlight image based on the analysis result of the image candidate section.

According to an embodiment of the disclosure, when the predetermined object is detected from the image frame corresponding to the image candidate section and the motion variation amount of the detected object satisfies a predetermined threshold value, the electronic device 100 may generate the image candidate section as the target section for generating the highlight image.

According to an embodiment of the disclosure, the operating method may be ended without the electronic device 100 generating the highlight image unless the predetermined object is detected from the image frame corresponding to the image candidate section.

Also, according to an embodiment of the disclosure, the operating method may be ended without the electronic device 100 generating the highlight image unless the motion variation amount of the detected object satisfies the predetermined threshold value.

According to an embodiment of the disclosure, the electronic device 100 may generate the highlight image based on the target section and provide the highlight image to a display when the target section is identified.

FIG. 5 is provided for the purpose of explaining an embodiment of the disclosure and the disclosure is not limited thereto.

Figure 6:
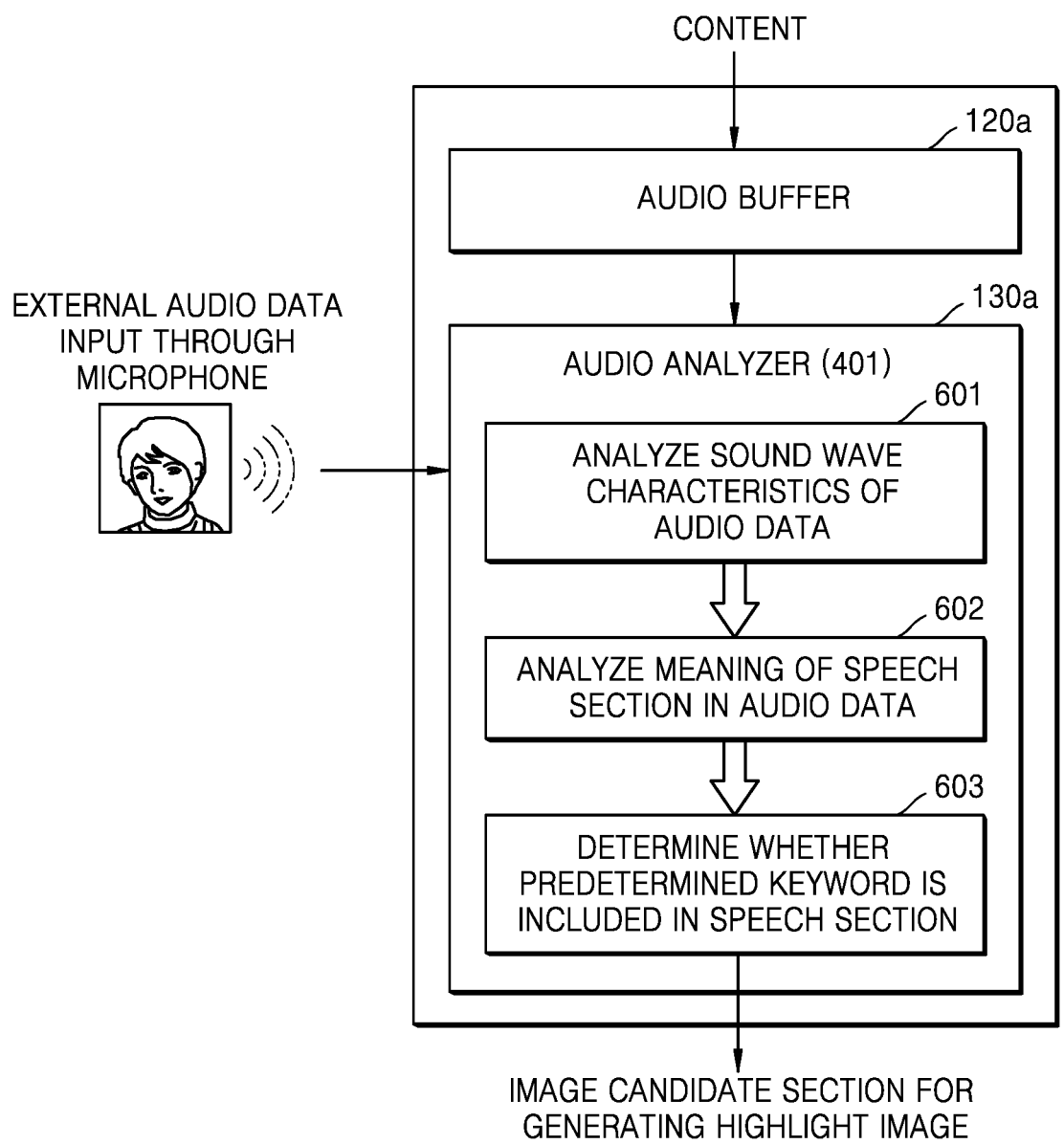
FIG. 6 is a diagram for explaining an example of identifying an image candidate section according to an embodiment of the disclosure.
Figure 7:
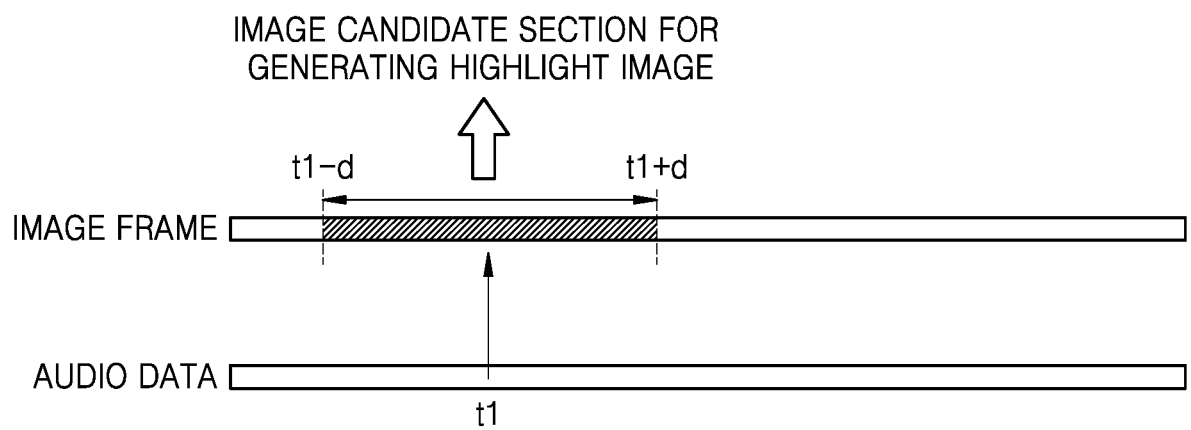
FIG. 7 is a diagram for explaining an example of identifying an image candidate section according to an embodiment of the disclosure.

FIG. 6 is a diagram for explaining an example of identifying an image candidate section according to an embodiment of the disclosure. FIG. 7 is a diagram for explaining an example of identifying an image candidate section according to an embodiment of the disclosure.

FIGS. 6 and 7 are diagrams for more specifically explaining the example of identifying the image candidate section from content.

According to an embodiment of the disclosure, the electronic device 100 store audio data corresponding to a predetermined period of time (e.g., k seconds) in an audio buffer 120a in order to display broadcast content received through the tuner 140 (FIG. 3).

The audio analyzer 401 included in the processor 130a may analyze sound wave characteristics from the audio data stored in the audio buffer 120a (601).

According to an embodiment of the disclosure, the sound wave characteristics may include intensity of sound, high and low pitches of sound, and the like.

Also, according to an embodiment of the disclosure, the audio analyzer 401 may analyze meaning of a speech section in the audio data (602). For example, the audio analyzer 401 may include a NLP (Natural Language Processing) module. The NLP module may analyze linguistic content of the speech section included in the audio data.

Also, according to an embodiment of the disclosure, the audio analyzer 401 may determine whether a predetermined keyword is included in the speech section (603).

According to an embodiment of the disclosure, the keyword may be preset for each type of content. For example, words 'home run' and 'score' may be set as keywords corresponding to baseball broadcast.

Further, according to an embodiment of the disclosure, the keyword may be preset for each user identification information. According to an embodiment of the disclosure, the preference of a user may be reflected in the setting of the keyword. For example, a weight of the keyword may be set to a high value for keywords 'home run' or 'safe' corresponding to specific user identification information.

Meanwhile, according to an embodiment of the disclosure, the audio data may include external audio data input through the microphone 161 (FIG. 3). For example, when speech of a viewer who is viewing broadcast is input through the microphone 161, the electronic device 100 may analyze the speech of the viewer. Based on an analysis result, the electronic device 100 may identify, as an image candidate section, a section corresponding to a time when the speech of the viewer is input, among a plurality of image frames included in content being played back.

Referring to FIG. 7, when a significant speech is analyzed from the audio data at a time t1 as a result of the analysis of the audio data, an image frame between a time t1−d before a predetermined time distance d from the time t1 and a time t1+d after the predetermined time distance d from the time t1 may be identified as the image candidate section for generating a highlight image.

According to an embodiment of the disclosure, the predetermined time distance d may be set for each type of content. For example, the time distance d corresponding to sports relay broadcast content may be set to 3 seconds. Also, the time distance d corresponding to movie content may be set to 10 seconds.

Also, according to an embodiment of the disclosure, the predetermined time distance d may be adjusted according to the extracted keyword. For example, when a keyword having a high weight is extracted, the time distance d for identifying the image candidate section may be adjusted to be high. Further, when a keyword having a low weight is extracted, the time distance d for identifying the image candidate section may be adjusted to be lower.

Figure 8:
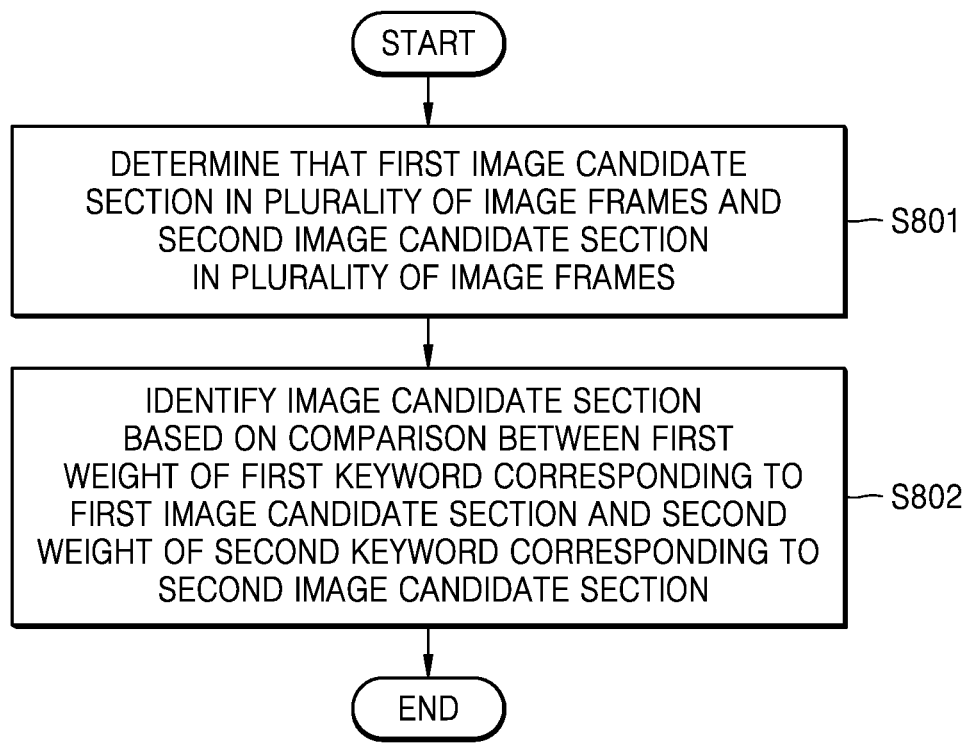
FIG. 8 is a diagram for explaining an example of identifying an image candidate section among a plurality of overlapping image candidate sections according to an embodiment of the disclosure.
Figure 9:
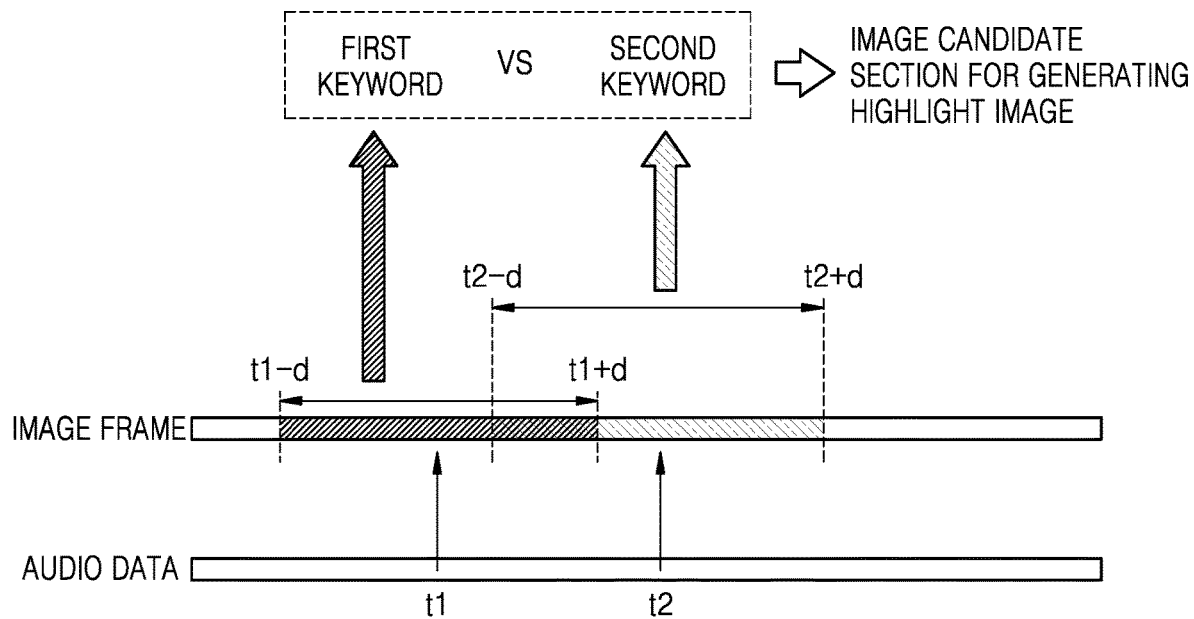
FIG. 9 is a diagram for explaining an example of identifying an image candidate section among a plurality of overlapping image candidate sections according to an embodiment of the disclosure.

FIG. 8 is a diagram for explaining an example of identifying an image candidate section among a plurality of overlapping image candidate sections according to an embodiment of the disclosure. FIG. 9 is a diagram for explaining an example of identifying an image candidate section among a plurality of overlapping image candidate sections according to an embodiment of the disclosure.

In operation S801 of FIG. 8, according to an embodiment of the disclosure, the electronic device 100 may determine that a first image candidate section of audio data and a second image candidate section of the audio data at least partially overlap.

Referring to FIG. 9, when the electronic device 100 analyzes the audio data included in content being played back, when a significant speech is analyzed at the time t1 from the audio data, the electronic device 100 may identify an image frame corresponding to a time period from the time t1−d to the time t1+d as the first image candidate section.

On the other hand, according to an embodiment of the disclosure, when the electronic device 100 analyzes the audio data included in the content being played back, when a significant speech is analyzed at a time t2 from the audio data, the electronic device 100 may determine an image frame corresponding to a time period from a time t2−d to a time t2+d as the second image candidate section.

As described above, when it is determined that a range of the plurality of image candidate sections partially overlaps, the electronic device 100 may perform an operation of selecting the image candidate section again based on a keyword.

In operation S802 of FIG. 8, according to an embodiment of the disclosure, the electronic device 100 may determine the image candidate section based on a comparison between a first weight of a first keyword corresponding to the first image candidate section and a second weight of a second keyword corresponding to the second image candidate section.

Referring to FIG. 9, because the time t1 and the time t2 are close to each other, when the first image candidate section corresponding to the time t1 and the second image candidate section corresponding to the time t2 at least partially overlap, the electronic device 100 may compare the first keyword of the first image candidate section t1−d~t1+d and the second keyword of the second image candidate section t2−d~t2+d.

According to an embodiment of the disclosure, a weight may be set for each keyword.

For example, a weight 10 may be set for the first keyword ('home run') and a weight 5 may be set for the second keyword ('score').

In the example of FIG. 9, when the first keyword detected in the first image candidate section is 'home run' and the second keyword detected in the second image candidate section is 'score', the first image candidate section corresponding to the first keyword having a higher weight may be determined.

FIGS. 8 and 9 are for the purpose of explaining an embodiment of the disclosure and the disclosure is not limited thereto.

FIG. 10 is a diagram for explaining an example of identifying a target section according to an embodiment of the disclosure.

According to an embodiment of the disclosure, the electronic device 100 may store an image frame corresponding to a predetermined period of time (for example, k seconds) in the video buffer 120a in order to display broadcast content received through the tuner 140.

According to an embodiment of the disclosure, the image analyzer 402 included in the processor 130a may acquire an image candidate section determined by the audio analyzer 401 (FIG. 6) from the audio analyzer 401.

According to an embodiment of the disclosure, the image analyzer 402 may detect an object included in the image frame corresponding to the image candidate section (1001). For example, the image analyzer 402 may detect a 'baseball bat' and a 'baseball ball', which are predetermined objects corresponding to baseball relay broadcast content, from the image frame corresponding to the image candidate section.

Also, according to an embodiment of the disclosure, the image analyzer 402 may calculate a motion variation amount of the detected object (1002).

For example, the image analyzer 402 may detect a baseball bat and a baseball ball from the baseball relay broadcast content, and track movement of the detected baseball bat and baseball ball. The image analyzer 402 may calculate a motion variation amount (e.g., a difference in moving speed, acceleration, moving direction, etc.) of the detected baseball bat and baseball ball.

According to an embodiment of the disclosure, the image analyzer 402 may identify the target section for generating a highlight image, based on an analysis result of the image candidate section.

For example, when it is determined that there is a motion variation amount equal to or greater than a predetermined threshold value based on the acceleration and the movement direction of the detected baseball ball according to an image frame analysis, the image candidate section may be identified as the target section for generating the highlight image.

Also, when a motion variation amount exceeding the predetermined threshold value is not detected based on the acceleration and the moving direction of the detected baseball ball according to the image frame analysis, the image candidate section may be filtered and the highlight image may not be generated.

FIG. 10 is provided for the purpose of explaining an embodiment of the disclosure and the disclosure is not limited thereto.

Figure 11:
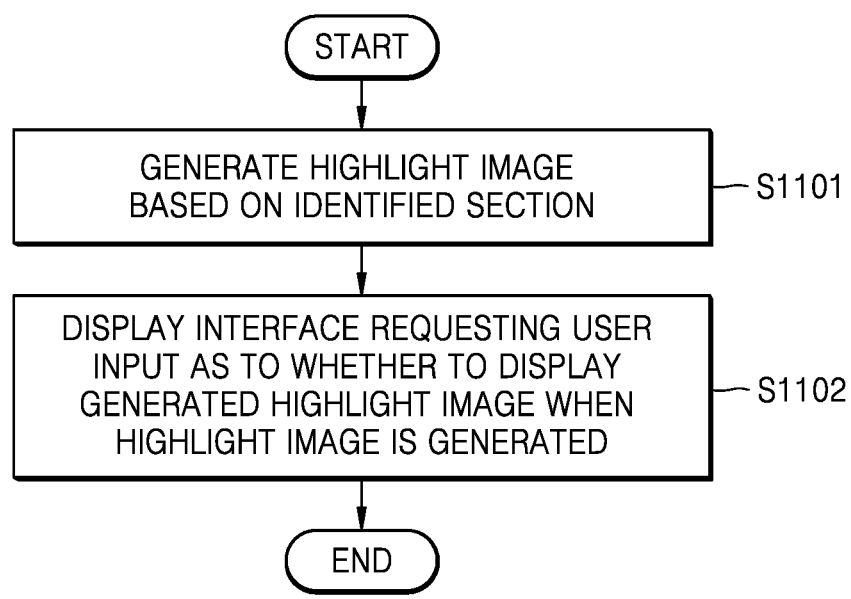
FIG. 11 is a diagram for explaining an example of automatically reproducing a highlight image according to an embodiment of the disclosure.
Figure 12:
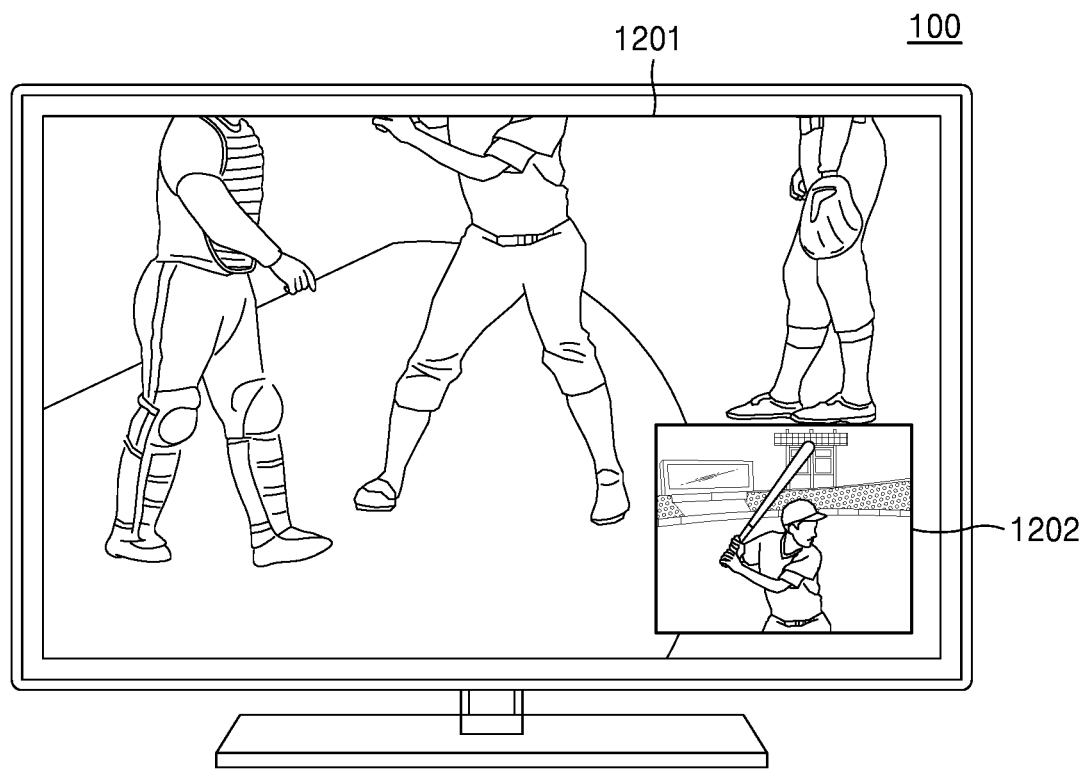
FIG. 12 is a diagram for explaining an example of automatically reproducing a highlight image according to an embodiment of the disclosure.

FIG. 11 is a diagram for explaining an example of automatically reproducing a highlight image according to an embodiment of the disclosure. FIG. 12 is a diagram for explaining an example of automatically reproducing a highlight image according to an embodiment of the disclosure.

In operation S1101 of FIG. 11, according to an embodiment of the disclosure, the electronic device 100 may generate the highlight image based on a identified target section.

According to an embodiment of the disclosure, the electronic device 100 may generate a slow motion image using an image frame included in the target section.

According to an embodiment of the disclosure, the processor 130 of the electronic device 100 may include a module for generating a slow motion image. For example, the electronic device 100 may generate the slow motion image by generating an image frame between an image frame t and an image frame t+1.

In operation S1102, according to an embodiment of the disclosure, as the highlight image is generated, the electronic device 100 may overlap and reproduce the generated highlight image on content being played back.

According to an embodiment of the disclosure, the electronic device 100 may automatically display the highlight image on the display 110 (FIG. 3) while the content is played back.

As shown in FIG. 12, the electronic device 100 may overlap and reproduce a highlight image 1202 on content 1201 being played back in a PIP format on at least a part of the display 110.

According to an embodiment of the disclosure, the electronic device 100 may provide a viewing environment in which the highlight image 1202 including an important scene may be viewed together while a user is viewing broadcast content.

FIGS. 11 to 12 illustrate an embodiment of the disclosure and the disclosure is not limited thereto.

Figure 13:
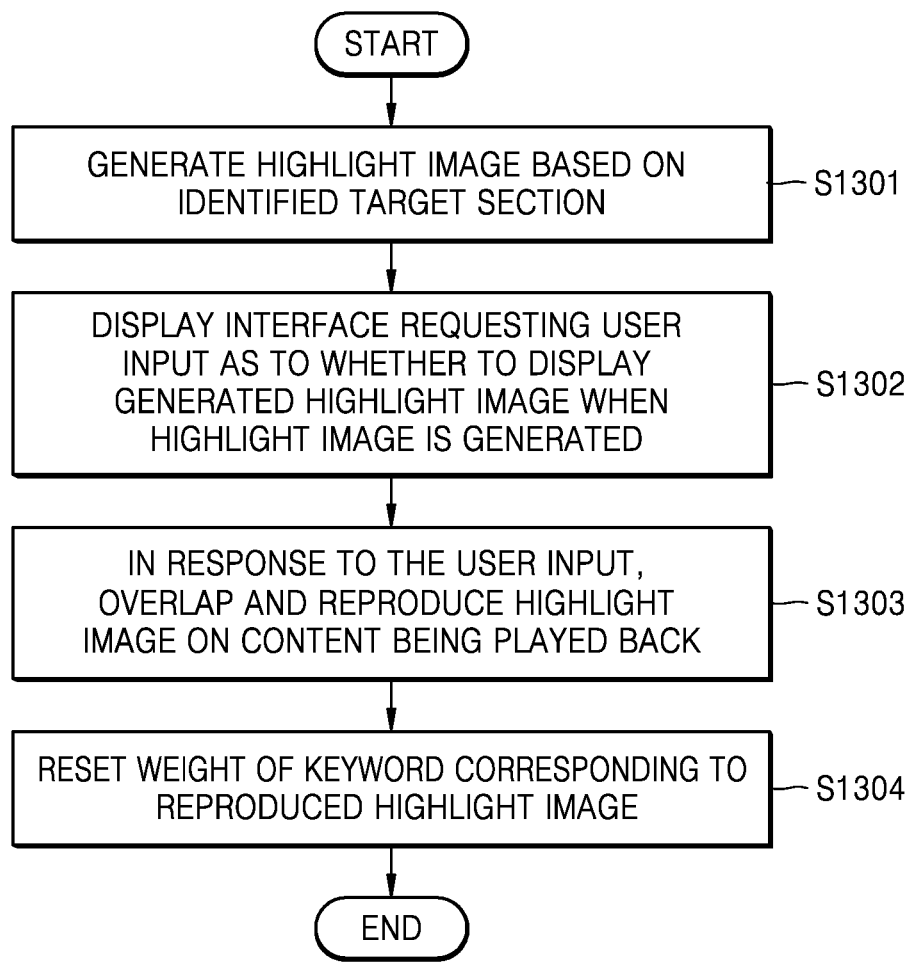
FIG. 13 is a diagram for explaining an example of reproducing a highlight image based on a user input according to an embodiment of the disclosure.
Figure 14:
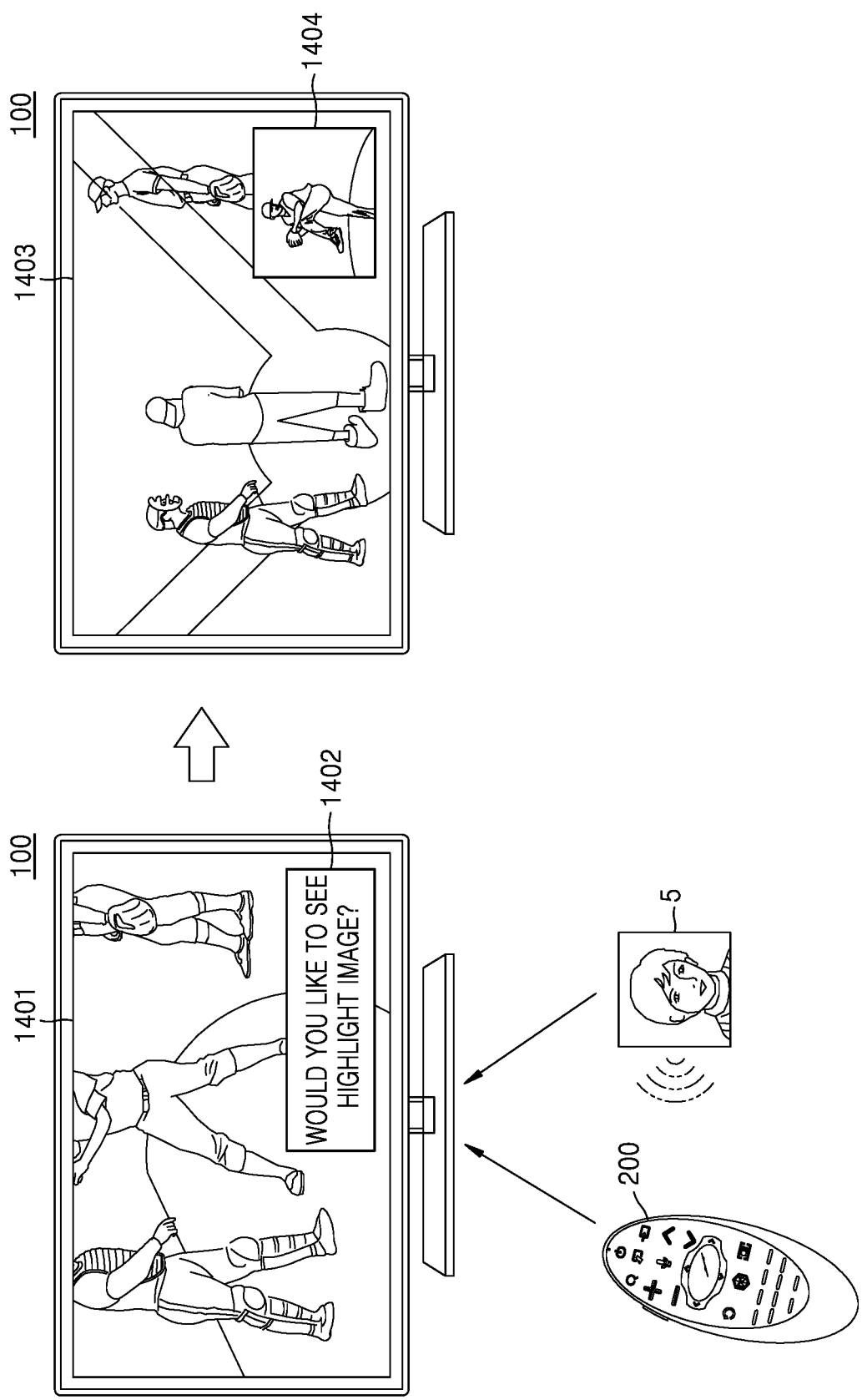
FIG. 14 is a diagram for explaining an example of reproducing a highlight image based on a user input according to an embodiment of the disclosure.

FIG. 13 is a diagram for explaining an example of reproducing a highlight image based on a user input according to an embodiment of the disclosure. FIG. 14 is a diagram for explaining an example of reproducing a highlight image based on a user input according to an embodiment of the disclosure.

In operation S1301, the electronic device 100 may generate the highlight image based on a identified target section.

According to an embodiment of the disclosure, the electronic device 100 may generate a slow motion image using an image frame included in the target section.

In operation S1302, according to an embodiment of the disclosure, the electronic device 100 may display an interface requesting the user input as to whether to display the generated highlight image as the highlight image is generated.

As shown in FIG. 14, for example, the electronic device 100 may display a notice 1402 (e.g., "Would you like to see a highlight image?") regarding the highlight image.

According to an embodiment of the disclosure, the electronic device 100 may notify a user that the highlight image is generated, and when there is the user input, the electronic device 100 may reproduce the generated highlight image.

According to an embodiment of the disclosure, the user input may be input as a control signal through the control device 200 (e.g., a remote control controller), but is not limited thereto.

According to an embodiment of the disclosure, the user input may be input as a speech command of a user 5. At this time, the electronic device 100 may activate a speech recognition function and may receive the speech command (e.g., "highlight video!") of the user 5 input through the microphone 161 (FIG. 3).

In operation S1303, according to an embodiment of the disclosure, the electronic device 100 may overlap and reproduce the highlight image on content being played back in response to the user input.

As shown in FIG. 14, the electronic device 100 may overlap and reproduce a highlight image 1404 on content 1403 being played back.

In operation S1304, according to an embodiment of the disclosure, the electronic device 100 may reset a weight of a keyword corresponding to the reproduced highlight image.

According to an embodiment of the disclosure, in case of the highlight image reproduced based on a selection input of the user, the electronic device 100 may reset the weight of the keyword included in the reproduced highlight image to be higher.

For example, when the highlight image is an image selected by the user to be viewed, a weight of a keyword included in the image may be reset to be high as an image having a preference of the user. Accordingly, when identifying an image candidate section for generating the highlight image at a later time, a weight of a reset keyword may be applied, and thus a user customized highlight image reflecting the preference of the user may be provided.

FIGS. 13 to 14 illustrate an embodiment of the disclosure and the disclosure is not limited thereto.

Figure 15:
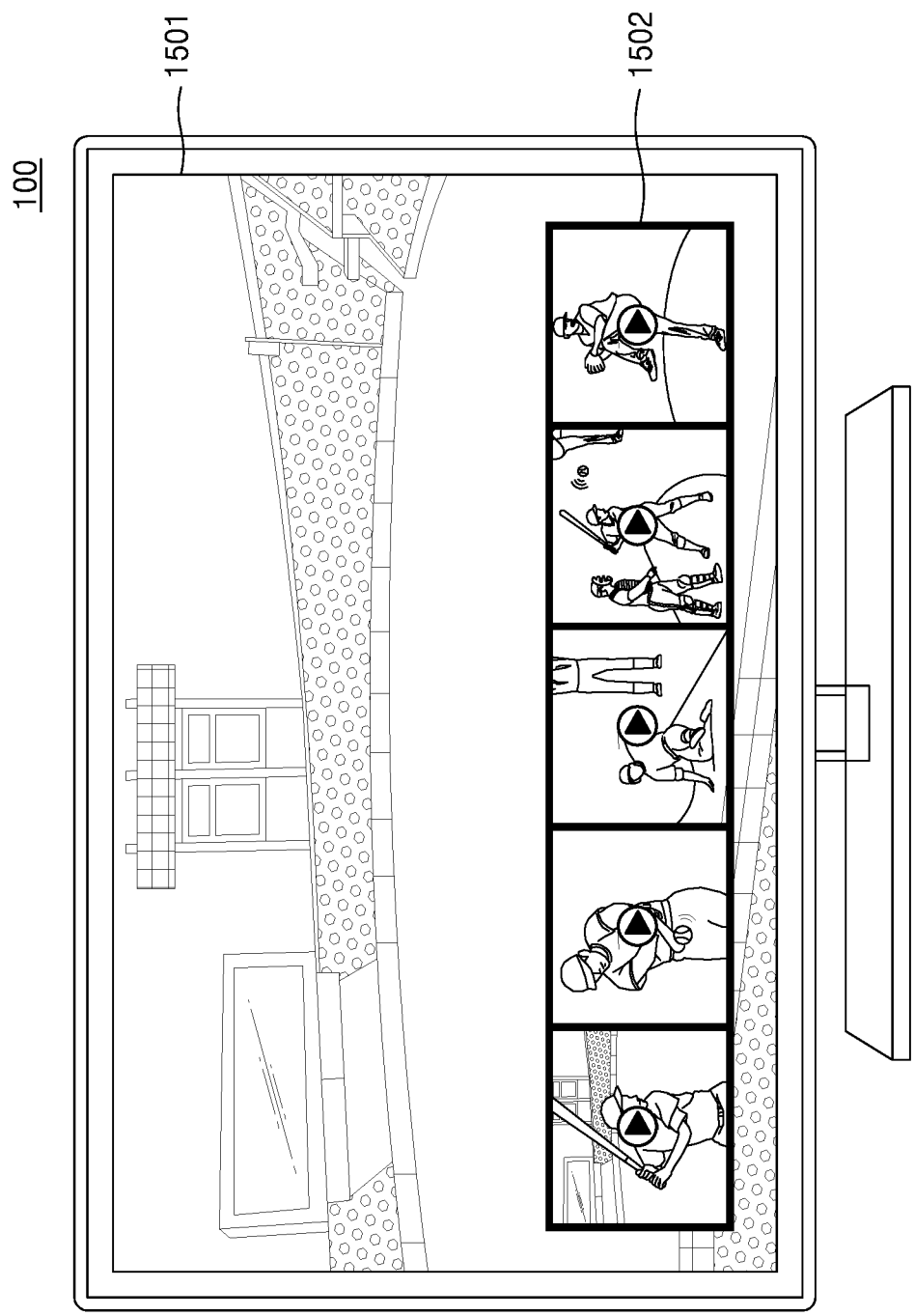
FIG. 15 is a diagram for explaining an example of providing lists of highlight images according to an embodiment of the disclosure.
Figure 16:
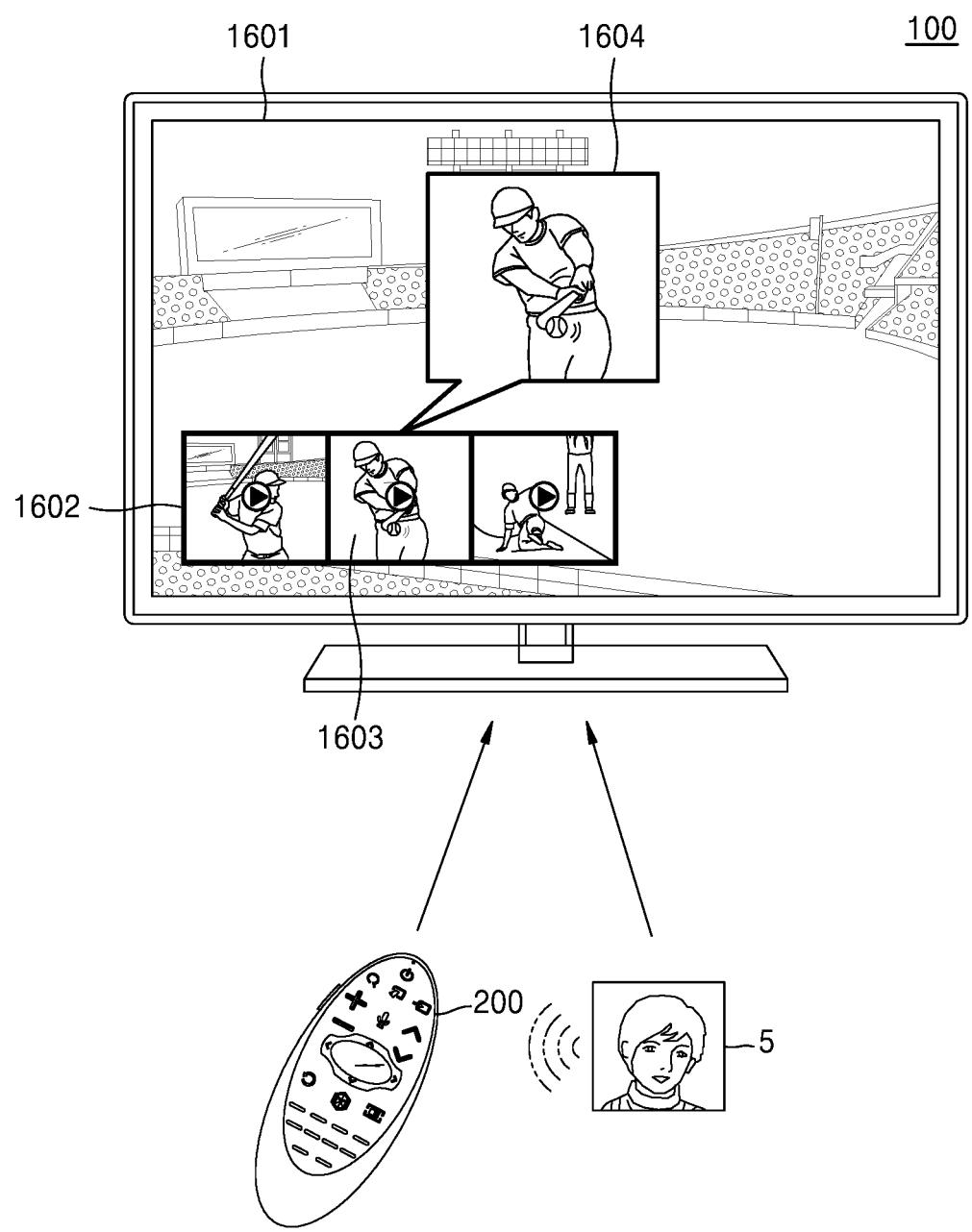
FIG. 16 is a diagram for explaining an example of providing lists of highlight images according to an embodiment of the disclosure.

FIGS. 15 and 16 are diagrams for explaining an example of providing lists 1502 and 1602 of highlight images respectively according to an embodiment of the disclosure.

As shown in FIG. 15, the electronic device 100 may display the list 1502 including one or more highlight images generated from one piece of content.

For example, at the end of viewing of one piece of broadcast content 1501 (e.g., a baseball relay broadcast), the electronic device 100 may provide the list 1502 to allow a user to select and view one or more highlight images generated again from the broadcast content.

As shown in FIG. 16, the electronic device 100 may enlarge and reproduce a highlight image 1603 based on a user input for selecting the highlight image 1603 from the list 1620 of highlight images on a pop-up type screen 1604.

According to an embodiment of the disclosure, the user input may include, but is not limited to, a control signal through control device 200, a speech command of the user 5.

FIGS. 15 to 16 illustrate an embodiment of the disclosure and the disclosure is not limited thereto.

Figure 17:
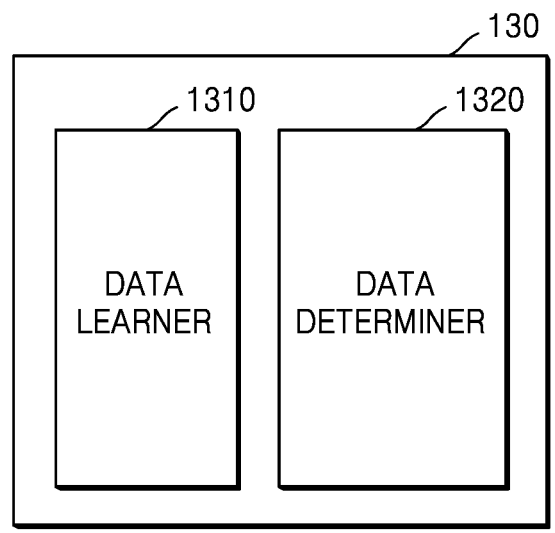
FIG. 17 is a block diagram of a processor according to an embodiment of the disclosure.

FIG. 17 is a block diagram of the processor 130 according to an embodiment of the disclosure.

The processor 130 of FIG. 17 may be an example of the processor 130 of FIGS. 2 and 3.

A component of the processor 130 is not limited to a data learner 1310 and a data determiner 1320 shown as components of the block diagram, but may be integrated, added, or omitted according to specifications of the actual implementation of the electronic device 100. That is, two or more components may be combined into one component, or one component may be subdivided into two or more components when necessary. Also, some components may be implemented as an external device (not shown) connectable with the electronic device 100.

Referring to FIG. 17, the processor 130 according to an embodiment of the disclosure may include the data learner 1310 and the data determiner 1320.

The data learner 1310 may learn a reference for determining a situation. The data learner 1310 may learn the reference about what data to use for determining the predetermined situation and about how to determine the situation using data. The data learner 1310 may obtain data to be used for learning, and apply the obtained data to the data determination model to be described later, thereby learning the reference for determining the situation.

The data determiner 1320 may determine the situation based on data. The data determiner 1320 may recognize the situation from predetermined data by using a trained data determination model. The data determiner 1320 may obtain predetermined data according to a predetermined reference by learning and use the data determination model having the obtained data as an input value, thereby determining the situation based on the predetermined data. Also, a resultant value output by the data determination model having the obtained data as the input value may be used to refine the data determination model.

At least one of the data learner 1310 or the data determiner 1320 may be manufactured in the form of at least one hardware chip and mounted on an electronic device. For example, at least one of the data learner 1310 or the data determiner 1320 may be manufactured in the form of a dedicated hardware chip for AI or may be manufactured as a part of an existing general purpose processor (e.g. a CPU or an application processor) or a graphics-only processor (e.g., a GPU) and mounted on the electronic device.

In this case, the data learner 1310 and the data determiner 1320 may be mounted on one electronic device or may be mounted on separate electronic devices. For example, one of the data learner 1310 and the data determiner 1320 may be included in the electronic device, and the other may be included in a server. The data learner 1310 and the data determiner 1320 may provide model information constructed by the data learner 1310 to the data determiner 1320 by wired or wirelessly, and provide data input to the data determiner 1320 to the data learner 1310 as additional training data.

Meanwhile, at least one of the data learner 1310 or the data determiner 1320 may be implemented as a software module. When the at least one of the data learner 1310 or the data determiner 1320 is implemented as the software module (or a program module including an instruction), the software module may be stored in non-transitory computer readable media. Further, in this case, at least one software module may be provided by an operating system (OS) or by a predetermined application. Alternatively, one of the at least one software module may be provided by the OS, and the other one may be provided by the predetermined application.

Figure 18:
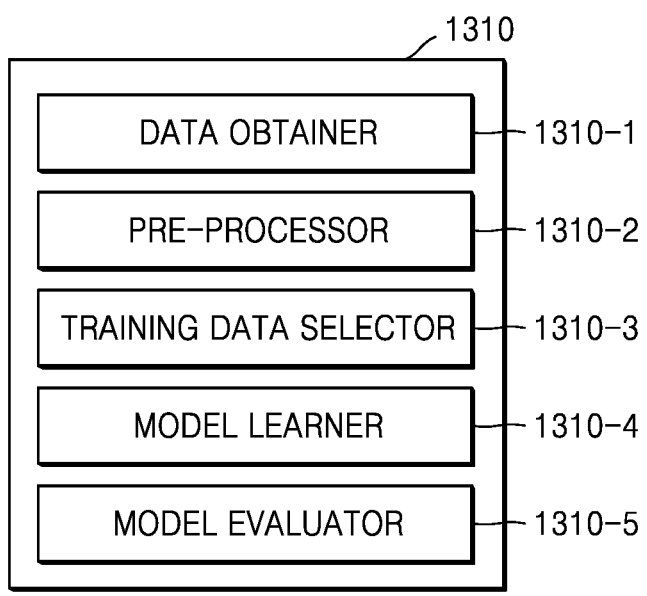
FIG. 18 is a block diagram of a data learner according to an embodiment of the disclosure.

FIG. 18 is a block diagram of the data learner 1310 according to an embodiment of the disclosure.

Referring to FIG. 18, the data learner 1310 according to an embodiment of the disclosure may include a data obtainer 1310-1, a preprocessor 1310-2, a training data selector 1310-3, a model learner 1310-4 and a model evaluator 1310-5.

The data obtainer 1310-1 may obtain data necessary for determining a situation. The data obtainer 1310-1 may obtain data necessary for learning for determining the situation.

Alternatively, the data obtainer 1310-1 may obtain data through an external device communicating with an electronic device.

According to an embodiment of the disclosure, image data may include a plurality of images (or frames). For example, the data obtainer 1310-1 may receive an input of a moving image through a camera of an electronic device including the data learner 1310 or an external camera (e.g., CCTV or black box or the like) capable of communicating with the electronic device including the data learner 1310.

Here, the camera may include one or more image sensors (e.g., a front sensor or a rear sensor), a lens, an image signal processor (ISP), or a flash (e.g., LED or xenon lamp, etc.)

The preprocessor 1310-2 may pre-process the obtained data such that the obtained data may be used for learning for determining the situation. The pre-processor 1310-2 may process the obtained data in a predetermined format such that the model learner 1310-4, which will be described later, may use the obtained data for learning for determining the situation. For example, the pre-processor 1310-2 may overlap at least some of a plurality of images (or frames) constituting at least a part of an input moving image to generate a composite image based on a common region included in each of the plurality of images. In this case, a plurality of composite images may be generated from one moving image. The common region may be a region including the same or similar common object (e.g., subject, plant, animal, person, or the like) in each of the plurality of images. Alternatively, the common region may be a region of the same or similar color, shade, RGB value, or CMYK value in each of the plurality of images.

The training data selector 1310-3 may select data necessary for learning from the preprocessed data. The selected data may be provided to the model learner 1310-4. The training data selector 1310-3 may select the data necessary for learning from the preprocessed data according to a predetermined reference for determining the situation. The training data selector 1310-3 may also select the data according to a predetermined reference by learning by the model learner 1310-4, which will be described later.

The model learner 1310-4 may learn a reference as to how to determine the situation based on training data. Also, the model learner 1310-4 may learn a reference as to which training data is used to determine the situation.

Also, the model learner 1310-4 may learn a data determination model used to determine the situation using the training data. In this case, the data determination model may be a previously constructed model. For example, the data determination model may be a previously constructed model by receiving basic training data (e.g., a sample image, etc.)

The data determination model may be constructed in consideration of an application field of a determination model, a purpose of learning, or the computer performance of an apparatus, etc. The data determination model may be, for example, a model based on a neural network. For example, a model such as Deep Neural Network (DNN), Recurrent Neural Network (RNN), and Bidirectional Recurrent Deep Neural Network (BRDNN) may be used as the data determination model, but is not limited thereto.

According to an embodiment of the disclosure, when there are a plurality of data determination models that are previously constructed, the model learner 1310-4 may determine a data determination model having a high relation between input training data and basic training data as the data determination model. In this case, the basic training data may be previously classified according to data types, and the data determination model may be previously constructed for each data type. For example, the basic training data may be previously classified according to various references such as a region where the training data is generated, a time at which the training data is generated, a size of the training data, a genre of the training data, a creator of the training data, a type of an object in the training data, etc.

Also, the model learner 1310-4 may train the data determination model using a learning algorithm including, for example, an error back-propagation method or a gradient descent method.

Also, the model learner 1310-4 may train the data determination model through supervised learning using, for example, the training data as an input value. Also, the model learner 1310-4 may train the data determination model through unsupervised learning to find the reference for situation determination by learning a type of data necessary for situation determination for itself without any guidance. Also, the model learner 1310-4 may train the data determination model, for example, through reinforcement learning using feedback on whether a result of situation determination based on the learning is correct.

Further, when the data determination model is trained, the model learner 1310-4 may store the trained data determination model. In this case, the model learner 1310-4 may store the trained data determination model in the memory 120 of the device 100 including the data determiner 1320. Alternatively, the model learner 1310-4 may store the trained data determination model in a memory of a server connected to the device 100 over a wired or wireless network.

In this case, the memory 120 in which the trained data determination model is stored may also store, for example, a command or data related to at least one other component of the electronic device. The memory may also store software and/or program. The program may include, for example, a kernel, middleware, an application programming interface (API), and/or an application program (or "application").

The model evaluator 1310-5 may input evaluation data to the data determination model, and when a recognition result output from the evaluation data does not satisfy a predetermined reference, the model evaluator 1310-5 may allow the model learner 1310-4 to be trained again. In this case, the evaluation data may be predetermined data for evaluating the data determination model.

For example, when the number or a ratio of evaluation data having an incorrect recognition result among recognition results of the trained data determination model with respect to the evaluation data exceeds a predetermined threshold value, the model evaluator 1310-5 may evaluate that the data determination model does not satisfy the predetermined reference. For example, when the predetermined reference is defined as a ratio of 2%, and the trained data determination model outputs an incorrect recognition result with respect to evaluation data exceeding 20 among a total of 1000 evaluation data, the model evaluator 1310-5 may evaluate that the trained data determination model is not suitable.

On the other hand, when there are a plurality of trained data determination models, the model evaluator 1310-5 may evaluate whether each of the trained motion determination models satisfies the predetermined reference and determine a model satisfying the predetermined reference as a final data determination model. In this case, when a plurality of models satisfy the predetermined reference, the model evaluator 1310-5 may determine any one or a predetermined number of models previously set in descending order of evaluation scores as the final data determination model.

Meanwhile, at least one of the data obtainer 1310-1, the preprocessor 1310-2, the training data selector 1310-3, the model learner 1310-4, or the model evaluator 1310-5 in the data learner 1310 may be manufactured in the form of at least one hardware chip and mounted on the electronic device. For example, the at least one of the data obtainer 1310-1, the preprocessor 1310-2, the training data selector 1310-3, the model learner 1310-4, or the model evaluator 1310-5 may be manufactured in the form of a dedicated hardware chip for AI or may be manufactured as a part of an existing general purpose processor (e.g. a CPU or an application processor) or a graphics-only processor (e.g., a GPU) and mounted on the electronic device.

Also, the data obtainer 1310-1, the preprocessor 1310-2, the training data selector 1310-3, the model learner 1310-4, and the model evaluator 1310-5 may be mounted on one electronic device or may be mounted on separate electronic devices. For example, some of the data obtainer 1310-1, the preprocessor 1310-2, the training data selector 1310-3, the model learner 1310-4, and the model evaluator 1310-5 may be included in the device 100, and the others may be included in a server.

Also, at least one of the data obtainer 1310-1, the preprocessor 1310-2, the training data selector 1310-3, the model learner 1310-4, or the model evaluator 1310-5 may be implemented as a software module. When the at least one of the data obtainer 1310-1, the preprocessor 1310-2, the training data selector 1310-3, the model learner 1310-4, or the model evaluator 1310-5 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

Figure 19:
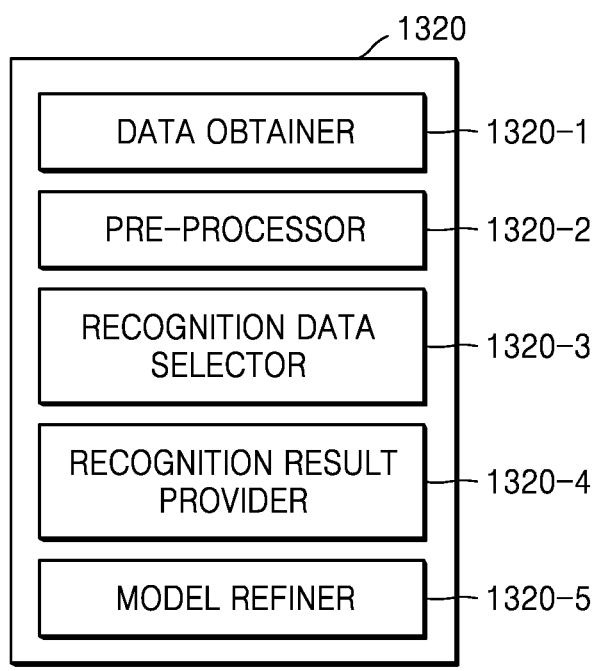
FIG. 19 is a block diagram of a data determiner according to an embodiment of the disclosure.

FIG. 19 is a block diagram of the data determiner 1320 according to an embodiment of the disclosure.

Referring to FIG. 19, the data determiner 1320 according to an embodiment of the disclosure may include a data obtainer 1320-1, a preprocessor 1320-2, a recognition data selector 1320-3, a recognition result provider 1320-4 and a model refiner 1320-5.

The data obtainer 1320-1 may obtain data necessary for determining a situation. The pre-processor 1320-2 may pre-process the obtained data such that the obtained data may be used for determining the situation. The pre-processor 1320-2 may process the obtained data to a predetermined format such that the recognition result provider 1320-4, which will be described later, may use the obtained data for determining the situation.

The recognition data selector 1320-3 may select data necessary for determining the situation from the preprocessed data. The selected data may be provided to the recognition result provider 1320-4. The recognition data selector 1320-3 may select some or all of the pre-processed data according to a predetermined reference for determining the situation. The recognition data selector 1320-3 may also select data according to the predetermined reference by learning by the model learner 1310-4, which will be described later.

The recognition result provider 1320-4 may generate the response message by applying the selected data to a data determination model. The recognition result provider 1320-4 may provide a recognition result according to a data recognition purpose. The recognition result provider 1320-4 may apply the selected data to the data determination model by using the data selected by the recognition data selector 1320-3 as an input value. Also, the recognition result may be determined by the data determination model.

The model refiner 1320-5 may modify the data determination model based on evaluation of the recognition result provided by the recognition result provider 1320-4. For example, the model refiner 1320-5 may provide the model learner 1310-4 with the recognition result provided by the recognition result provider 1320-4 such that the model learner 1310-4 may modify the data determination model.

Meanwhile, at least one of the data obtainer 1320-1, the preprocessor 1320-2, the recognition data selector 1320-3, the recognition result provider 1320-4, or the model refiner 1320-5 in the data determiner 1320 may be manufactured in the form of at least one hardware chip and mounted on the device 1000. For example, the at least one of the data obtainer 1320-1, the pre-processor 1320-2, the recognition data selector 1320-3, the recognition result provider 1320-4, or the model refiner 1320-5 may be manufactured in the form of a dedicated hardware chip for AI or may be manufactured as a part of an existing general purpose processor (e.g. a CPU or an application processor) or a graphics-only processor (e.g., a GPU) and mounted on the electronic device.

Also, the data obtainer 1320-1, the preprocessor 1320-2, the recognition data selector 1320-3, the recognition result provider 1320-4, and the model refiner 1320-5 may be mounted on one device 100 or may be mounted on separate electronic apparatuses. For example, some of the data obtainer 1320-1, the preprocessor 1320-2, the recognition data selector 1320-3, the recognition result provider 1320-4, and the model refiner 1320-5 may be included in an electronic device, and the others may be included in a server.

Also, at least one of the data obtainer 1320-1, the pre-processor 1320-2, the recognition data selector 1320-3, the recognition result provider 1320-4, or the model refiner 1320-5 may be implemented as a software module. When the at least one of the data obtainer 1320-1, the preprocessor 1320-2, the recognition data selector 1320-3, the recognition result provider 1320-4, or the model refiner 1320-5 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

The device described above according to the embodiments of the disclosure may include a processor, a memory for storing program data and executing it, a permanent storage unit such as a disk drive, a communication port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium may also be distributed over network coupled computer systems so that the computer readable code is stored and executed in a distributive manner. This media may be read by the computer, stored in the memory, and executed by the processor.

The embodiment of the disclosure may be described in terms of functional block components and various processing steps. Such functional blocks may be realized by any number of hardware and/or software components configured to perform the specified functions. For example, the disclosure may employ various integrated circuit (IC) components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the disclosure could employ any number of conventional techniques for electronics configuration, signal processing and/or control, data processing and the like. The words "mechanism", "element", "means", and "configuration" are used broadly and are not limited to mechanical or physical embodiments of the disclosure, but may include software routines in conjunction with processors, etc.

The particular implementations shown and described in the disclosure are illustrative examples of the disclosure and are not intended to otherwise limit the scope of the disclosure in any way. For the sake of brevity, conventional electronics, control systems, software development and other functional aspects of the systems may not be described in detail.

Descriptions of an embodiment of the disclosure are examples, and it may be understood by one of ordinary skill in the art that various changes in form and details may be made therein without departing from the spirit and scope of the disclosure as defined by the appended claims. Thus, an embodiment of the disclosure is merely examples in every aspect and should not be construed as being limited to the embodiment set forth herein. For example, components that are described as a single piece may be separated, and components that are described as being separated may be integrated.

The use of any and all examples and exemplary language provided herein is intended merely to better illuminate the disclosure and does not pose a limitation on the scope of the disclosure unless otherwise claimed.

Moreover, no item or component is essential to the practice of the disclosure unless the element is specifically described as "essential" or "critical".

It will be understood by one of ordinary skilled in the art that various changes in form and details may be made therein without departing from the spirit and scope of the disclosure as defined by the appended claims.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure. The embodiments of the disclosure should be considered in descriptive sense only and not for purposes of limitation.

While the disclosure has been particularly shown and described with reference to embodiments thereof, it will be understood by those of ordinary skill in the art that various changes in form and details may be made therein without departing from the spirit and scope of the disclosure as defined by the following claims.

The terms, such as 'unit' or 'module', etc., described herein should be understood as a unit that processes at least one function or operation and that may be embodied in a hardware manner, a software manner, or a combination of the hardware manner and the software manner.

The "unit" or the 'module' may be stored in an addressable storage medium, or may be implemented by a program that may be executed by a processor.

For example, the "unit" or the 'module' may be implemented by components such as software components, object-oriented software components, class components, and task components, processes, functions, properties, procedures, sub-routines, segments of program codes, drivers, firmware, micro codes, circuits, data, data base, data structures, tables, arrays, and parameters.

Throughout the specification, the description "A may include one of a1, a2 or a3" may mean, in a broad sense, that example elements that may be included in the element A are a1, a2, or a3.

Due to the above described description, the elements forming the element A are not limited to a1, a2, or a3. Therefore, the element that may be included in the A element should not be exclusively construed as being limited to a1, a2, and a3 excluding other elements that are not specified herein.

The description means that the element A may include a1, may include a2, or may include a3. The description does not mean that elements included in the element A should be selectively determined from a preset group. For example, the description should not be construed as being limited to that a1, a2, or a3 selected from a group necessarily including a1, a2, and a3 configures a component A.

In addition, throughout the disclosure, the expression "at least one of a1, a2, and a3" indicates only a1, only a2, only a3, both a1 and a2, both a1 and a3, both a2 and a3, all of a1, a2, and a3, or variations thereof. Therefore, unless otherwise clearly stated as "at least one of a1, at least one of a2, and at least one of a3", the expression "at least one of a1, a2, and a3" should not be construed as "at least one of a1", "at least one of a2", and "at least one of a3".

What is claimed is:

1. An electronic device comprising:
    a memory storing one or more instructions; and
    a processor configured to execute the one or more instructions stored in the memory to:
    analyze a meaning of a speech section in audio data included in a content being played on the electronic device,
    based on an analysis result of the speech section, identify, from among a plurality of image frames included in the content, an image candidate section for generating a highlight image, the image candidate section having a time distance,
    analyze an object included in an image frame corresponding to the image candidate section among the plurality of image frames, and
    identify a target section for generating the highlight image based on an analysis result of the image candidate section,
    wherein the processor is further configured to execute the one or more instructions to adjust the time distance of the image candidate section according to a weight of a predetermined keyword in the speech section.

2. The electronic device of claim 1, wherein the processor is further configured to execute the one or more instructions to:
    generate the highlight image based on the identified target section, and
    overlap and reproduce the generated highlight image on the content being played when the highlight image is generated.

3. The electronic device of claim 1, wherein the processor is further configured to execute the one or more instructions to:
    analyze sound wave characteristics of the audio data included in the content being played.

4. The electronic device of claim 1, wherein the processor is further configured to execute the one or more instructions to:

determine whether the predetermined keyword is included in the speech section.

5. The electronic device of claim 1, further comprising a microphone,
wherein the processor is further configured to execute the one or more instructions to:
analyze external audio data input from outside the electronic device through the microphone.

6. The electronic device of claim 1, wherein the processor is further configured to execute the one or more instructions to:
based on a first image candidate section in the plurality of image frames at least partially overlapping a second image candidate section in the plurality of image frames, identify the image candidate section based on a comparison between a first weight of a first keyword corresponding to the first image candidate section and a second weight of a second keyword corresponding to the second image candidate section.

7. The electronic device of claim 1, wherein the processor is further configured to execute the one or more instructions to:
detect the object included in the image frame corresponding to the image candidate section and calculate a motion variation amount of the detected object.

8. The electronic device of claim 1, wherein the processor is further configured to execute the one or more instructions to:
generate the highlight image based on the identified target section,
display an interface requesting a user input as to whether to display the generated highlight image when the highlight image is generated,
in response to the user input, overlap and reproduce the highlight image on the content being played, and
reset a weight of a keyword corresponding to the reproduced highlight image.

9. The electronic device of claim 1, wherein the processor is further configured to execute the one or more instructions to:
control a display to display a list comprising one or more highlight images generated from the content being played.

10. An operation method of an electronic device, the operation method comprising:
analyzing a meaning of a speech section in audio data included in a content being played on the electronic device;
based on an analysis result of the speech section, identifying, from among a plurality of image frames included in the content, an image candidate section for generating a highlight image, the image candidate section having a time distance;
analyzing an object included in an image frame corresponding to the image candidate section among the plurality of image frames; and
identifying a target section for generating the highlight image based on an analysis result of the image candidate section,
wherein the operation method further comprises adjusting the time distance of the image candidate section according to a weight of a predetermined keyword in the speech section.

11. The operation method of claim 10, further comprising:
generating the highlight image based on the identified target section; and
overlapping and reproducing the generated highlight image on the content being played when the highlight image is generated.

12. The operation method of claim 10, further comprising:
analyzing sound wave characteristics of the audio data included in the content being played back.

13. The operation method of claim 10, further comprising:
determining whether the predetermined keyword is included in the speech section.

14. The operation method of claim 10, further comprising:
analyzing external audio data input from outside the electronic device through a microphone.

15. The operation method of claim 10, wherein the identifying of the image candidate section comprises:
determining that a first image candidate section in the plurality of image frames at least partially overlaps a second image candidate section in the plurality of image frames; and
based on the first image candidate section at least partially overlapping the second image candidate section, identifying the image candidate section based on a comparison between a first weight of a first keyword corresponding to the first image candidate section and a second weight of a second keyword corresponding to the second image candidate section.

16. The operation method of claim 10, wherein the analyzing of the object comprises:
detecting the object included in the image frame corresponding to the image candidate section; and
calculating a motion variation amount of the detected object.

17. The operation method of claim 10, further comprising:
generating the highlight image based on the identified target section;
displaying an interface requesting a user input as to whether to display the generated highlight image when the highlight image is generated;
in response to the user input, overlapping and reproducing the highlight image on the content being played; and
resetting a weight of a keyword corresponding to the reproduced highlight image.

18. The operation method of claim 10, further comprising:
controlling a display to display a list comprising one or more highlight images generated from the content being played.

19. A non-transitory computer-readable recording medium having recorded thereon a program for performing the method of claim 10 on a computer.

* * * * *